(12) United States Patent
Iqbal et al.

(10) Patent No.: US 10,467,070 B2
(45) Date of Patent: Nov. 5, 2019

(54) PROCESSING CLOUD SERVICES AND INTELLIGENCE CLOUD SERVICES INTEGRATION

(71) Applicant: Oracle International Corporation, Redwood Shores, CA (US)

(72) Inventors: Arif Iqbal, San Carlos, CA (US); Avinash Dabholkar, Fremont, CA (US); Amit Naik, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 15/491,866

(22) Filed: Apr. 19, 2017

(65) Prior Publication Data

US 2018/0074873 A1   Mar. 15, 2018

Related U.S. Application Data

(60) Provisional application No. 62/395,284, filed on Sep. 15, 2016, provisional application No. 62/395,285, filed on Sep. 15, 2016.

(51) Int. Cl.
*G06F 9/54* (2006.01)
*G06F 17/30* (2006.01)
*G06F 16/25* (2019.01)

(52) U.S. Cl.
CPC ............ *G06F 9/546* (2013.01); *G06F 16/258* (2019.01)

(58) Field of Classification Search
None
See application file for complete search history.

(56) References Cited

U.S. PATENT DOCUMENTS

| 2014/0229423 | A1* | 8/2014 | Bengali | G06F 11/1469 707/602 |
| 2014/0229628 | A1* | 8/2014 | Mandal | H04L 65/60 709/231 |
| 2016/0197980 | A1* | 7/2016 | Durairajan | H04L 67/10 709/223 |

\* cited by examiner

*Primary Examiner* — Umut Onat
(74) *Attorney, Agent, or Firm* — Trellis IP Law Group, PC

(57) ABSTRACT

Various embodiments provide for integrating process cloud services (PCS) with intelligence cloud service (ICS). PCS analytics data is obtained using one or more PCS analytics data export application programming interfaces (APIs). A semantic model is provided to a predefined ICS system. The PCS analytics data is transferred to an ICS integration service. The PCS analytics data is converted into a format for a target intelligence system. The converted PCS analytics data is transferred to a service for later distribution as star schema data, for use by Representational State Transfer (REST) Application Programming Interfaces (APIs). The PCS analytics data is transferred from the ICS integration service to the predefined ICS system, for use by the ICS integration service to integrate PCS with the ICS system.

20 Claims, 15 Drawing Sheets

FIGURE 9

TABLE 3: values that AnalyticsArchiveService uses from the UI 800.

| UI 901 | KEY 902 | Getter for MBean Property Values 903 | MBean Property Name 904 |
|---|---|---|---|
| Analytics Archive Cron Expression | autoArchiveCronSpec | ArchiveAttributeUtil.getInstance().getAnalyticsArchiveCronExpression() | AnalyticsArchiveCronExpression |
| Analytics Archive Enabled Checkbox | autoArchiveEnabled | ArchiveAttributeUtil.getInstance().isAnalyticsArchiveEnabled() | AnalyticsArchiveEnabled |
| Analytics Archive Max Job Timeout | autoArchiveMaxRuntime | ArchiveAttributeUtil.getInstance().getAnalyticsArchiveMaxRuntime() | AnalyticsArchiveMaxRuntime |
| BICS Integration Enabled Checkbox | bicsIntegrationEnabled | ArchiveAttributeUtil.getInstance().isBicsIntegrationEnabled() | BicsIntegrationEnabled |
| Analytics Archive Start Date | autoArchiveStartDate | ArchiveAttributeUtil.getInstance().getAnalyticsArchiveStartDate() | AnalyticsArchiveStartDate |
| Notification Address | notificationAddress | ArchiveAttributeUtil.getInstance().getPCSArchiveNotificationAddress() | PCSArchiveNotificationAddress |

910

PROCESSING CLOUD SERVICES AND INTELLIGENCE CLOUD SERVICES INTEGRATION

CROSS REFERENCES TO RELATED APPLICATIONS

This application claims priority from U.S. Provisional Patent Application Ser. No. 62/395,284, entitled PCS AND BICS INTEGRATION, filed on Sep. 15, 2016 and U.S. Provisional Patent Application Ser. No. 62/395,285, entitled PROCESS STAR SCHEMA DATA MANAGEMENT FOR CLOUD BASED BUSINESS INTELLIGENCE, filed on Sep. 15, 2016, which are hereby incorporated by reference as if set forth in full in this application for all purposes This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

A Process Cloud Service (PCS) is a cloud-based software development Platform as a Service (PaaS) that provides a hosted environment for customer process applications. A PCS includes Workspace and Composer environments. In Workspace, end users can perform process tasks, and administrators can monitor process performance. Applications developed in Composer can be deployed to and used in Workspace. However, PCS may not have all of the information and the capabilities to perform desired functions.

Manufacturers of a PCS, such as Oracle™ Corporation, seek to improve the performance and desirability of PaaS products and related software. Although specific references may be made to certain products or types of products, features described herein may be adapted for use in other types of products or software applications, as desired.

SUMMARY

Various embodiments provide for integrating process cloud services (PCS) with intelligence cloud service (ICS). PCS analytics data is obtained using one or more PCS analytics data export application programming interfaces (APIs). A semantic model is provided to a predefined ICS system. The PCS analytics data is transferred to an ICS integration service. The PCS analytics data is converted into a format for a target intelligence system. The converted PCS analytics data is transferred to a service for later distribution as star schema data, for use by Representational State Transfer (REST) Application Programming Interfaces (APIs). The PCS analytics data is transferred from the ICS integration service to the predefined ICS system, for use by the ICS integration service to integrate PCS with the ICS system.

One embodiment provides a tangible processor-readable storage device that performs a method of integrating process cloud services (PCS) with intelligence cloud service (ICS), wherein the tangible processor-readable storage device includes instructions executable by one or more processors for: obtaining PCS analytics data using one or more PCS analytics data export application programming interfaces (APIs); providing a semantic model to a predefined ICS system; transferring the PCS analytics data to an ICS integration service; converting the PCS analytics data into a format for a target intelligence system; transferring the converted PCS analytics data to a service for later distribution as star schema data, for use by Representational State Transfer (REST) Application Programming Interfaces (APIs); and transferring the PCS analytics data from the ICS integration service to the predefined ICS system, for use by the ICS integration service to integrate PCS with the ICS system A further understanding of the nature and the advantages of particular embodiments disclosed herein may be realized by reference of the remaining portions of the specification and the attached drawings.

BRIEF DESCRIPTION OF THE DRAWINGS

FIG. 9 depicts a table with values that AnalyticsArchiveService uses from the user interface of FIG. 8, according to one embodiment.

DETAILED DESCRIPTION OF EMBODIMENTS

Overview of Discussion

Although various embodiments are described in the context of business, some embodiments may be suited to contexts that are not business related. For example, an intelligence cloud service that is not business related can be used, such as public education, and government, among other things.

Various embodiments provide cloud based dynamic creation of business intelligence (BI) semantic model and real-time extract, transform and load (ETL) to enable business correlated dashboards and trend analysis.

PCS analytics data is communicated to a target business intelligence (BI) system via Business Intelligence Cloud Service (BICS) and is also archived in an analytics star schema. "PCS analytics data export application programming interfaces (APIs)" are used as part of communicating the PCS analytics data to the target BI system and archiving them in the analytics star schema. BICS integration enables PCS to communicate the PCS analytics data to BICS, which is outside of PCS. Additional information from other sources can also be collected at BICS. The customer can analyze and correlate the PCS analytics data, alone or in combination with the additional data. The customer can perform searches to retrieve archived PCS analytics data, for example, from the analytics star schema and perform analysis and correlation on the retrieved PCS analytics data. The customer can use the PCS analytics data alone or in combination with the additional information to create business correlated dashboards and perform trend analysis. Non-update-able old archived PCS analytics data can be exported and purged from the analytics star schema.

PCS is integrated with a predefined BICS using a bridge. The bridge includes, for example, publishing Representational State Transfer (REST) Application Programming Interfaces (APIs); providing a semantic model; and converting the PCS analytics data into a format for the target BI system.

Exemplary Systems

Figure 1:
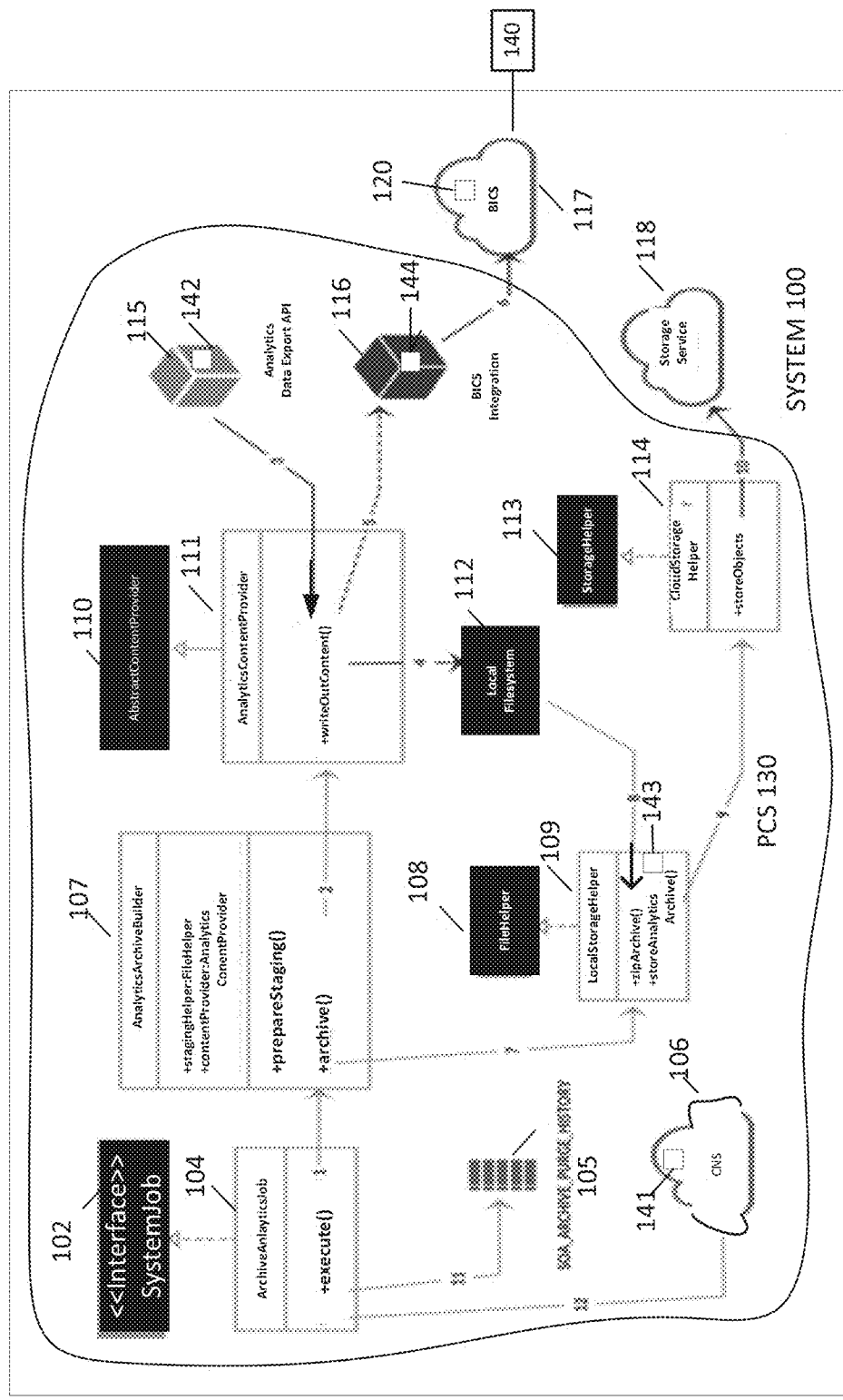
FIG. 1 depicts a block diagram of an analytics archive and export service system, according to one embodiment

FIG. 1 depicts a block diagram of an analytics archive and export service system 100, according to one embodiment.

The system 100 includes an interface system job 102, ArchiveAnalyticsJob 104, SOA_ARCHIVE_PURGE_HISTORY 105, cloud notification service 106, AnalyticsArchiveBuilder 107, FileHelper 108, LocalStorageHelper 109, AbstractContentProvider 110, AnalyticsContentProvider 111, Local Filesystem 112, Storage Helper 113, CloudStorageHelper 114, Analytics Data Export API 115, BICS Integration 116, BICS 117, tables 120 inside of BICS 117, and cloud storage service 118. PCS 130 includes 102, 104, 105, 106, 107, 108, 109, 110, 111, 112, 113, 114, 115, and 116, according to one embodiment. BICS 117, storage service 118 and the target BI system 140 are outside of PCS 130. The target BI system 140 is outside of the system 100. FIG. 1 depicts three intelligence systems. They are BICS integration service 116. BICS 117 and the target BI system 140.

BICS 117 is a predefined BICS. The predefined BICS is an "out of the box BICS." PCS 130 can be configured to provide a bridge to work with the predefined BICS, as discussed herein. Features 104, 107, 109, 110, 111, 114 are depicted in FIG. 1 as object oriented classes.

There is a bridge between PCS 130 and the predefined BICS 117. The bridge is provided by publishing Representational State Transfer (REST) Application Programming Interfaces (APIs), providing a semantic model 120 and converting the PCS analytics data 142 into a format for the target intelligence system 140 can use resulting in converted PCS data 144. According to one embodiment, the published REST APIs have query parameters that include startDateFilter and endDateFilter, as discussed herein. The BICS tables 120 provide a semantic model for a customer to design their dashboards. An example of the format is Java Script object Notation (JSON) format.

FIG. 1 depicts an execution flow of a system 100 using arrows that are numbered 1-12. Referring to FIG. 1, the system 100 has the following flow, according to one embodiment:

1) Job start 102 invokes execute( ) in ArchiveAnalyticsJob 104. Execute( ) will invoke prepareStaging( ) and archive( ) in AnalyticsArchiveBuilder 107.

2) The archive( ) method of AnalyticsArchiveBuilder 107 invokes the writeOutContent( ) method of AnalyticsContentProvider 111.

3) The writeOutContent( ) obtains the PCS analytics data 142 from the Analytics Data Export APIs 115 for the respective DataObjects.

4) The writeOutContent( ) writes the PCS analytics data 142 to the local staging area, provided by local filesystem 112, for archiving.

5) A thread is spawned for transferring the same PCS analytics data 142 to BICS Integration service 116.

6) BICS Integration Service 116 sends the PCS analytics data 142 to BICS 117.

7) After the data 142 is written to the local filesystem 112, archive( ) in AnalyticsARchiveBuilder 107 invokes the zipArchive( ) method of LocalStorageHelper 109 to compress the data 142 into zip files 143.

8) The zipArchive( ) methods compresses the data 142 in the local staging area, of the local filesystem 112, thus, creating the zip files 143.

9) The storeAnalyticsArchive( ) of LocalStorageHelper 109 is then invoked which calls storeObjects( ) method of the CloudStorageHelper 114.

10) The storeObjects( ) then transfers those zip files 143 to Cloud Storage Service 118.

11) A row is created in the SOA_ARCHIVE_PURGE_HISTORY table 105 with the ARCHIVE_DATE updated at the end of a successful Export Job.

12) In case of failure, a notification 141 is provided to a user. The notification 141 describes the Export job failure. According to one embodiment, Human WorkFlow (HWF) Notification Service 106 sends the notifications 141.

A customer's target business intelligence system 140 can obtain the PCS analytics data 142 from BICS 117. The target business intelligence system 140 can request the PCS analytics data 142 from BICS 117 or the PCS analytics data 140 can be pushed from BICS 117 to the target business intelligence system 140 without being requested.

Figure 2:
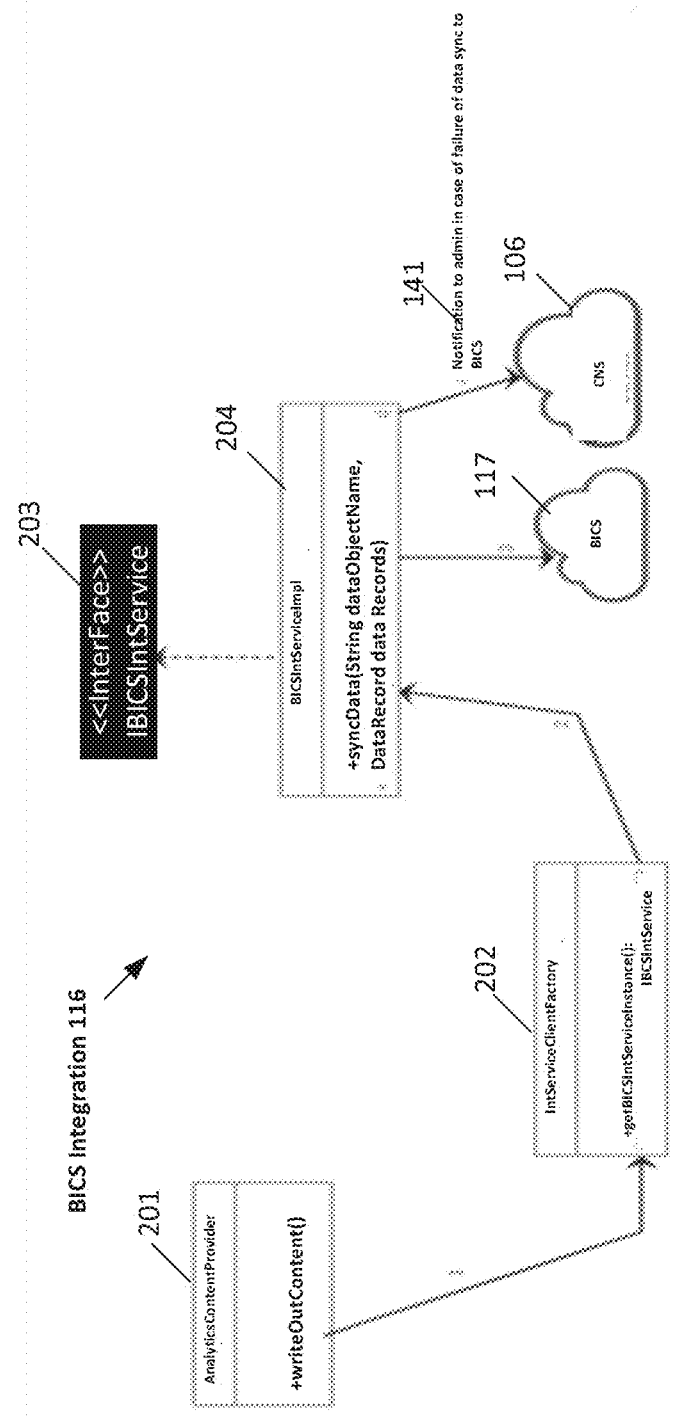
FIG. 2 depicts a block diagram of a BICS integration service, according to one embodiment.

FIG. 2 depicts a block diagram of an integration service design 200 for BICS integration 116, according to one embodiment.

The design 200 includes AnalyticsContentProvider 201, IntServiceClientFactory 202, Interface IBICSIntSErvice.java 203, BICSIntServiceeImpl 204, BICS 117, and Cloud Notification Service 106. Features 201, 202, 203, 204 are depicted in FIG. 2 as object oriented classes. Features 201, 202, 203, and 204 are part of BICS integration 116, according to one embodiment. AnalyticsContentProvider 201 includes the method writeOutContent( ) IntServiceClientFactory 202 includes the method getBICSIntServiceINstance( ):IBCSIntService. BICSIntServiceImpl 204 includes the method syncData(String dataObjectName, DataRecord dataRecords).

The numbers depicted on FIG. 2 indicate the flow between the features represented by 201-204, 117 and 106, as follows, according to one embodiment:

1) writeOutContent ( ) in AnalyticsContentProvider 201 communicates with getBICSIntServiceInstance( ): IBICSIntService in IntServiceClientFactory 202.

2) getBICSIntServiceInstance( ) IBICSIntService communicates with syncData(String dataObjectName, DataRecord dataRecords) in BICSIntServiceImpl 204, 3) syncData(String dataObjectName, DataRecord dataRecords) communicates with BICS 117, 4) syncData(String dataObjectName, DataRecord dataRecords) communicates with Cloud Notification Service 106.

IBICSIntService.java 203 provides method interfaces for pingService, SyncData, and cleanUPData. All of them are public methods that return void, according to one embodiment. SyncData has parameters String dataObjectName, DataRecord dataRecords. PingServer and cleanUpData do not have input or output parameters, according to one embodiment.

BICSIntServiceImpl.java 204 implements the methods of the interfaces provided by IBICSIntService.java 203.

Figure 7:
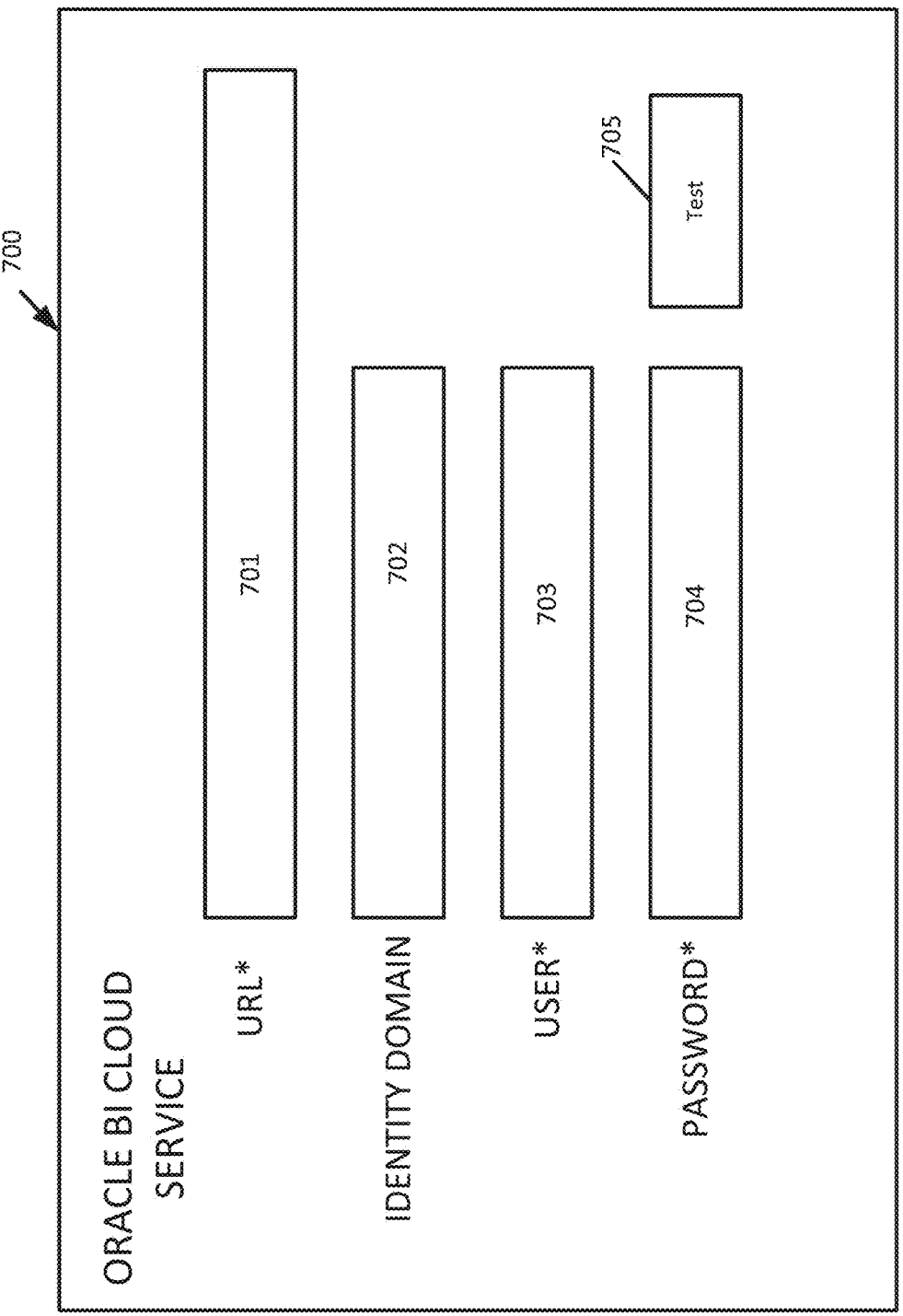
FIG. 7 depicts a block diagram of a page of a user interface, according to one embodiment.

BICSIntServiceImpl.java 204 is the implementation class that implements the methods defined in IBICSIntService.java 203. PingServer( ) pings BICS 117 at the time that the user configures BICS 117. Pinging helps the user to determine if they are doing something wrong while configuring BICS 117 with a user interface, such as page 700 (FIG. 7). The user is notified if the configuration using page 700 is successful and then they can save the configuration.

The syncData method synchronizes the PCS analytics data and pushes the PCS analytics data to BICS 117. SyncData method obtains the PCS analytics data from a queue, converts the PCS analytics data 142 into a format that the BICS 117 understands, and then pushes the converted PCS analytics data 144 to the BICS 117. The format that the BICS 117 understands is part of the bridge, as discussed herein. The tables 120 (FIG. 1) are created as a part of syncData method synchronizing the PCS data.

The cleanUpData( ) method deletes the PCS analytics data so that processing of the PCS analytics data can be restarted.

The handle to the IBICSIntService.java 203 can be provided via IntServiceClientFactory.java 202, as follows: public static IBICSIntService getBICSIntServiceInstance( ).

The method IBICSIntService getBICSIntServiceInstance( ) in the IntService Client Factory 202 instantiates an instance of BICSIntServiceImpl 204.

pingServer( ):

Checks alive status of BICS 117 (FIG. 1). If BICS 117 is not alive, then exception is thrown with a message, such as "Cannot initialize connection with BI Cloud Service. Contact administrator to verify the configuration"

An attempt is made to create a dummy table i.e. PCS_BICS_DUMMY_TABLE, to verify write permissions for a give user. If the user does not have write permission to BICS, then an exception is thrown, for example, with message "Configured user(s) is not privileged for BICS Integration, Contact administrator to assign user to the required role" According to one embodiment, the PCS_BICS_DUMMY_TABLE is created in BICS during intial test during connection setup between PCS and BICS so that PCS knows that BICS is ready for use.

Figure 3:
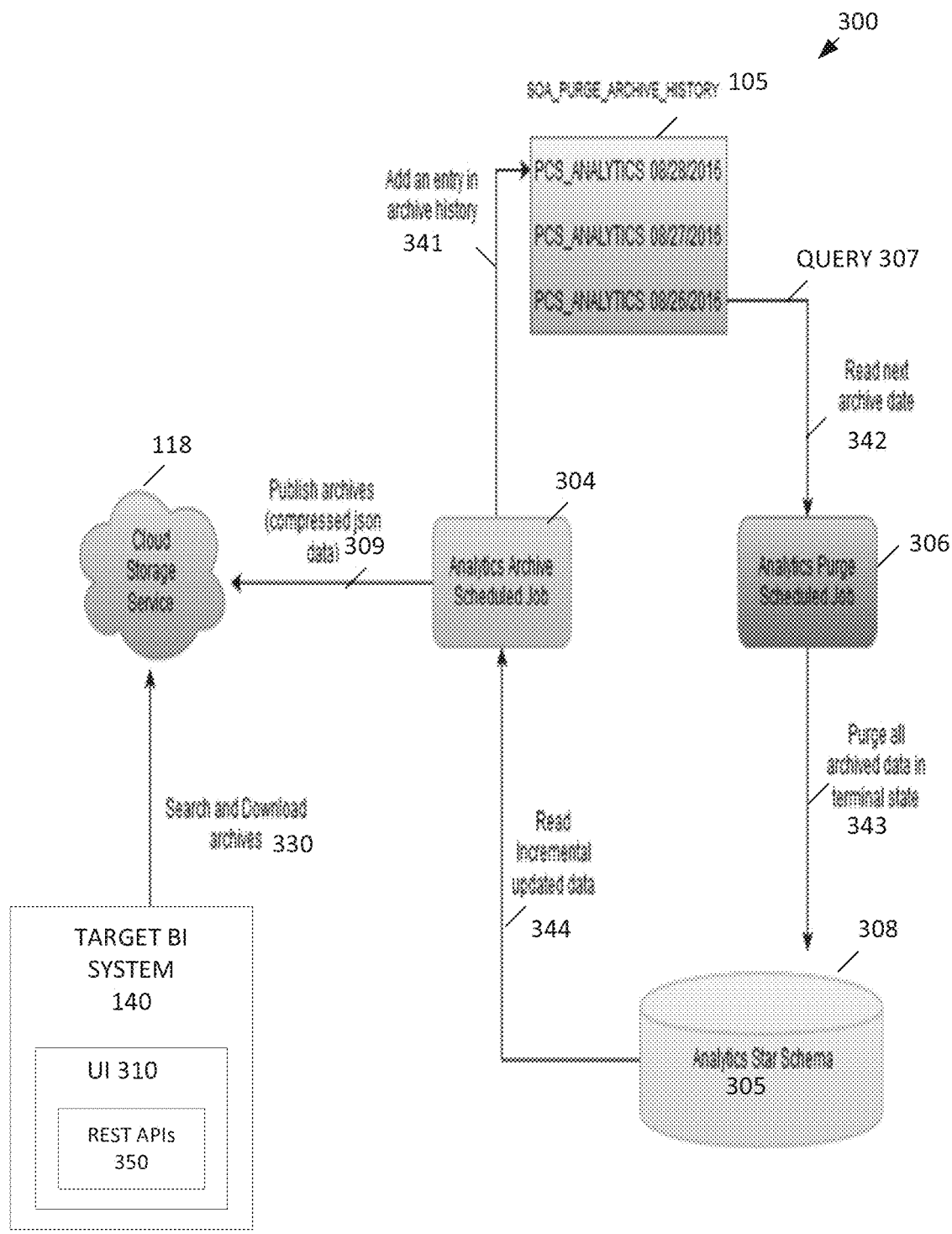
FIG. 3 depicts a block diagram of a system, according to one embodiment.

FIG. 3 depicts a block diagram of a system 300 for process star schema data management for cloud based intelligence, according to one embodiment.

The system 300 includes a customer 301, a user interface 310 of a target BI system 140, a cloud storage service 118 (FIG. 1), an analytics archive scheduled job 304, an SOA_PURGE_ARCHIVE_HISTORY table 105 an analytics purge scheduled job 306, and an analytics star schema 305. The customer 301 can communicate with the job 304 through the cloud storage service 118 (FIG. 1) to search and download 330 archives, for example, from the analytics star schema 305. The analytics archive scheduled job 304 publishes 309 archives 305, for example, as compressed JSON data, to the cloud storage service 118 (FIG. 1). The analytics archive scheduled job 304 adds 341 an entry in the archive history 105. The history 105 includes historical entries of when data was last archived, such as PCS_ANALYTICS Aug. 28, 2015, Aug. 27, 2015, Aug. 26, 2016. The history 105 uses a query 307 to read 342 the next archive data from the analytics star schema 305. The query 307 queries the schema 305, reads the schema 305, and data mines the schema 305 to determine what data to purge 343 from the analytics star schema 305. The query 307 is a select statement specifying the minimum archive data obtained from the SOA_ARCHIVE_PURGE_HISTORY table 105. The analytics purge scheduled job 306 purges 343, for example, all archived data in a terminal state, as discussed herein, from the analytics star schema 305. The analytics archive scheduled job 304 reads 344 incremental updated data from the analytics star schema 305.

The user interface 310 uses the REST APIs 350 that are published by PCS 130 to perform the search and download 330 of archives from the analytics star schema 305.

Figure 4:
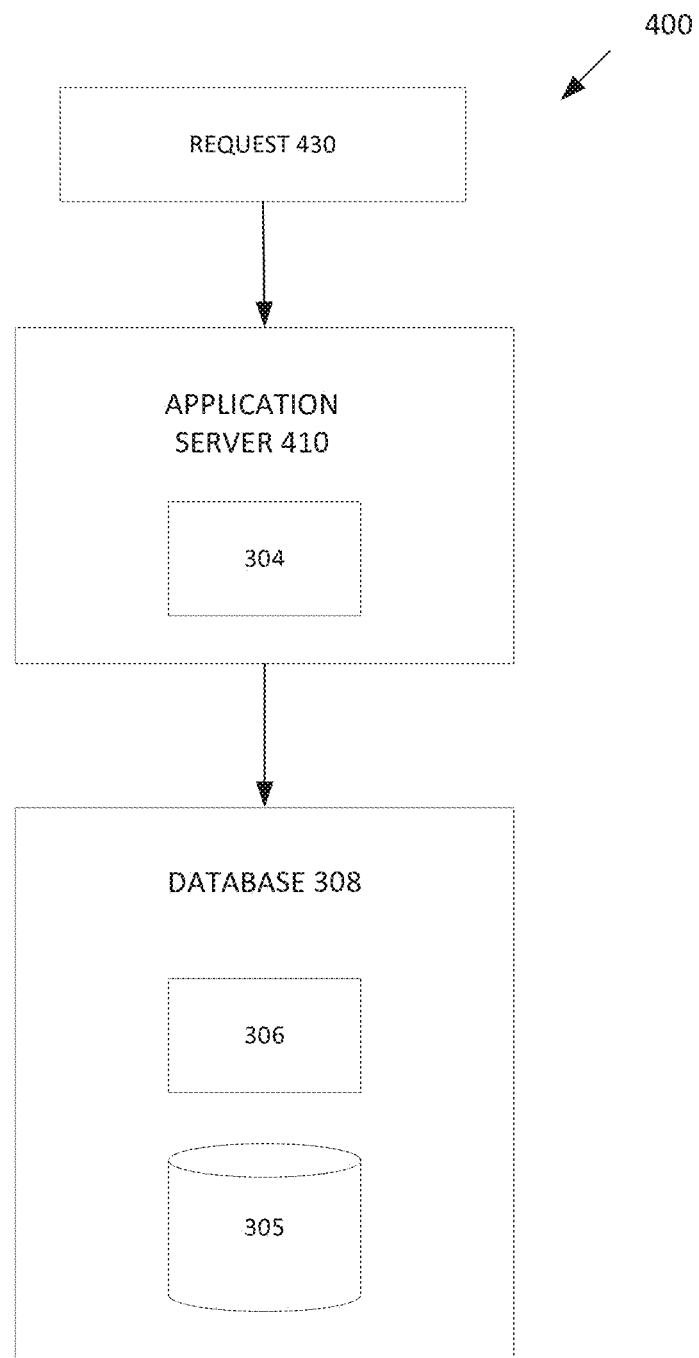
FIG. 4 depicts a block diagram of a system, according to one embodiment.

FIG. 4 depicts a block diagram of a system, according to one embodiment. The system 400 includes an application server 410 and a database 308. The server 410, according to one embodiment, is implemented using J2EE. The server 410 includes the analytics archive scheduled job 304. The database 308 includes the analytics star schema 305 and the analytics purge scheduled job 306. The server 410 receives requests 430. The server 410 communicates with the database 308.

As part of the rcu schema install and upgrade, a database management system (DBMS) job 306 (FIG. 3) (also referred to as "purge job" or "DBMS purge store procedure") for analytics purge is created as follows in the $pchome/admin/ddlutils/src/soa/soainfra_jobs.xml file.

According to one embodiment, this database management service (DBMS) scheduled job 306 is created during both installs and upgrade scenarios.

The following table 1 depicts pseudocode for the DBMS job 306, according to one embodiment.

TABLE 1 pseudocode for DBMS job 306 create schedule for pcs analytics purge job, for example, using dbms_schedule.create_schedule.
CREATE JOB and ARGs using, for example, dbms_scheduler.create_job and dmbs_scheduler.set_job_argument_value.

As seen above in Table 1, the analytics purge DBMS job 306 is defined, according to one embodiment, to invoke the standard SOA "soa_delete_others" dbms program.

The job 306, according to one embodiment, is configured with parameters obtained from a user interface, as discussed herein.

According to one embodiment, a pcs_analytics.delete_star_schema( ) procedure performs logic as depicted in Table 2 below.

TABLE 2 pcs_analytics.delete_star_schema( ) procedure

1. Purge Fact Tables
1.1. Query the Process fact table i.e BPM_PV_PROCESS_V and fetch all process component instance ids where are in terminal state.
The query can be made with filters taking care of retention time and batch size
1.2. If no records found, break;

TABLE 2-continued pcs_analytics.delete_star_schema( ) procedure 1.3. Purge records in all standard fact data objects with matching
2. Purge Dimension Table and associated fact table records
2.1 Query the Process Definition Table for all undeployed process.
2.2 If no records found, break;
2.3 Purge records from fact tables as follows
Delete a composite definition if all process definitions for it are removed.

Various embodiments allow a cloud based platform service 130 (FIG. 1) to natively publish 309 (FIG. 3) analytics information to a target business intelligence service 140 (FIG. 3). According to one embodiment, integration allows a user to configure their target BI system 140 (FIG. 3) enabling the analytics data to be publish 309 (FIG. 3) to their target BI system 140 (FIG. 3). A platform service, such as process cloud services (PCS) 130 (FIG. 1), automatically reads those configurations, determines if a customer has configured the platform service 130 (FIG. 1) to publish 309 (FIG. 3) the analytics information 305 (FIG. 3) requested for that target BI store 140 (FIG. 3) and automatically creates the corresponding artifacts in that target BI store 140 (FIG. 3), which will hold the requested analytics data. Further, the synchronization (also referred to as a "sync up") of all of the data from the local process task schema 305 (FIG. 3) is performed incrementally. The local process task schema is associated with the platform service 130 (FIG. 1). The requested data from the star scheme 305 is communicated to the target BI store 140 (FIG. 3). This allows customers 301 (FIG. 3) to define their own business processes, to model their business in a set of processes, to define the approvals they want, to obtain data securely, and to automate their business processes. Further, various embodiments are provided for a full life cycle that includes design, execution, unit test, system test, optimization, and so on.

Conventionally, Process Cloud Services (PCS) Archive & Export functionality archives only PCS Runtime records i.e. process instance, task instance etc. Therefore, various embodiments allow an archive framework to export PCS Analytics data 142 (FIG. 1), as discussed herein. This enables PCS 130 (FIG. 1) to provide a default set of dashboards over process analytics data, for example, using a workspace, as discussed herein. With this integration, customers can retrieve PCS analytics data and create rich dashboards.

Various embodiments provide for: using an archive framework to archive and export PCS analytics data 142 (FIG. 1), providing the ability to publish 309 (FIG. 3) process star schema data 305 (FIG. 3) to a target BI system 140 (FIG. 3), and using a workspace to embed dashboards created in BICS 117 (FIG. 1).

According to one embodiment, a content system is provided. The content system provides information collected from various sources and allows people 301 (FIG. 3) to obtain business insights from that collected information. Business intelligence can be used for analyzing various types of information and allowing correlation to business artifacts for a specific business concept. For example, in the case of a business process that is an expense approval, there may be a desire to determine which division people are from who are spending money on business travel. PCS 130 (FIG. 1) may not have that information. That information may be somewhere else. Business intelligence tools, for example associated with BICS 117 and/or the target BI system 140 (FIG. 1), can be used to perform correlated analytics.

Therefore, according to one embodiment, a standardized interface is provided where process specific analytics information can be made available to a business intelligence system 140 (FIG. 1) that is outside PCS 130 (FIG. 1). Various embodiments provide for communicating with a predefined BICS 117 (FIG. 1) and propagating PCS model(s) to BICS 117 (FIG. 1), which are used in BICS 117 (FIG. 1) to define the data structures. In yet another embodiment, data 305 (FIG. 3) is published 309 (FIG. 3) to business intelligence (BI) store 140 (FIG. 1 and FIG. 3) so that BICS 117 (FIG. 1) can start working on the published data in whatever way the customer 301 wants. A standardized interface, according to one embodiment, is used to publish 309 (FIG. 3) data 305 (FIG. 3) to the BI store 140 (FIG. 1 and FIG. 3). Business intelligence models are automatically created for use by BICS 117 (FIG. 1). The process of populating the BI store 140 (FIG. 1 and FIG. 3) with the PCS analytics data 142 (FIG. 1) is performed during execution time, for example using a schedule that starts the system job 102 (FIG. 1), as discussed herein.

Run Time Design

According to one embodiment, a scheduler is provided for exporting and archiving PCS Analytics 142 (FIG. 1) and creating STAR schema data 305 (FIG. 3). Analytics archive service scheduler can have the following responsibilities: Call Analytics Archive/Export service, and invoke BICS integration service 116 (FIG. 1). Analytics Archive/Export Service provides operations 1-12 depicted in FIG. 1 and can be created by leveraging existing Archive/Export Service framework provided by PCS 130 (FIG. 1), as discussed herein. Analytics Archive Service archives the PCS analytics data 142 to cloud storage services 118 (FIG. 1 and FIG. 3) resulting in star schema data 305 (FIG. 3). Notifications are sent to stakeholders 301 (FIG. 3) regarding PCS analytics data 142 (FIG. 1) being archived. By default BPM Process Administration Analytics Archive service details are stored persistently, according to one embodiment, in a BPM_ARCHIVEREQUEST TABLE.

According to one embodiment, a hard stop is generated after a number of retries due to a failure of BICS integration service 116 (FIG. 1). The retries may even be internal retries. The hard stop may be generated, for example, after 3 retries that are separated, for example, by respective 90 second intervals. According to one embodiment, after a hard stop, a notification is transmitted to a human user. The notification includes a start timestamp, a download link, and lists all of the archives since the failure. After the hard stop, jobs do not synchronize data to BICS 117 (FIG. 1). The user, according to one embodiment, manually synchronizes all the data that couldn't be transferred to BICS 117 (FIG. 1) due to the hard stop. The user can perform the manual synchronization by downloading the zip files from CSS 118 (FIG. 1 and FIG. 3) using the download link provided in the notification. According to one embodiment, the notification is an email.

Various types of entities could be stakeholders that receive notifications. A stakeholder could be anyone interested in receiving notification(s) of progress of various types of processing, according to various embodiments. One specific example of a stakeholder is an administrator. In one example, job 102 (FIG. 1) may be scheduled based on the configuration, which the administrator has provided based on the frequency of synchronization the data that is to be collected. An administrator is a user with administration privileges. This scheduled job 102 (FIG. 1) may be triggered based on a periodic frequency of an attempt to publish 309

(FIG. 3) PCS analytics data. The notification system 106 (FIG. 1) may be configured to inform the administrator that the BICS synchronization is executing. A notification 141 (FIG. 1) can be sent to the administrator (or other types of stackholders) when the BICS synchronization is successful. Further, various types of notifications 141 (FIG. 1) can be sent to the administrator (or other types of stackholders) when a problem or failure occurs, such as if BICS 117 (FIG. 1) is down.

Figure 5:
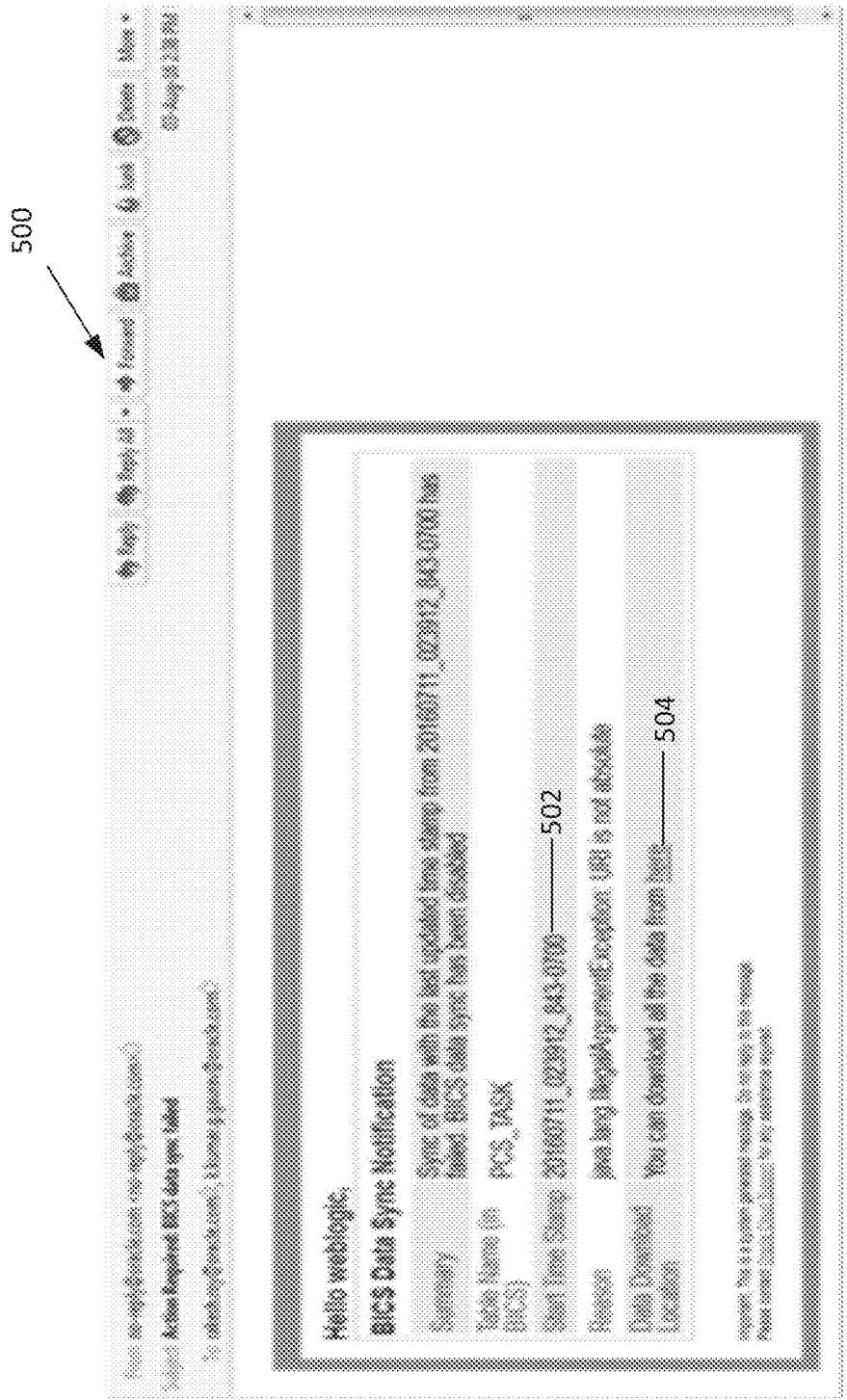
FIG. 5 depicts a block diagram of a notification, according to one embodiment.

FIG. 5 depicts a block diagram of a notification 500, according to one embodiment. Notification 500 is an example of a notification 141 (FIG. 1 and FIG. 2).

The notification 500, according to one embodiment, indicates that a hard stop has been generated for the BICS integration service 116 (FIG. 1), as discussed herein. The notification 500, according to one embodiment, is sent with a time stamp 502 and a download link 504. The download link 504 provided in the notification 500, according to one embodiment, lists all the archives that have occurred since the hard stop.

A user, according to one embodiment, can use the download link 504 to manually sync all the data 142 (FIG. 1) that couldn't be transferred to BICS 117 (FIG. 1), due to the hard stop, by downloading the zip files 143 (FIG. 1) from CSS 118 (FIG. 1).

Figure 6:
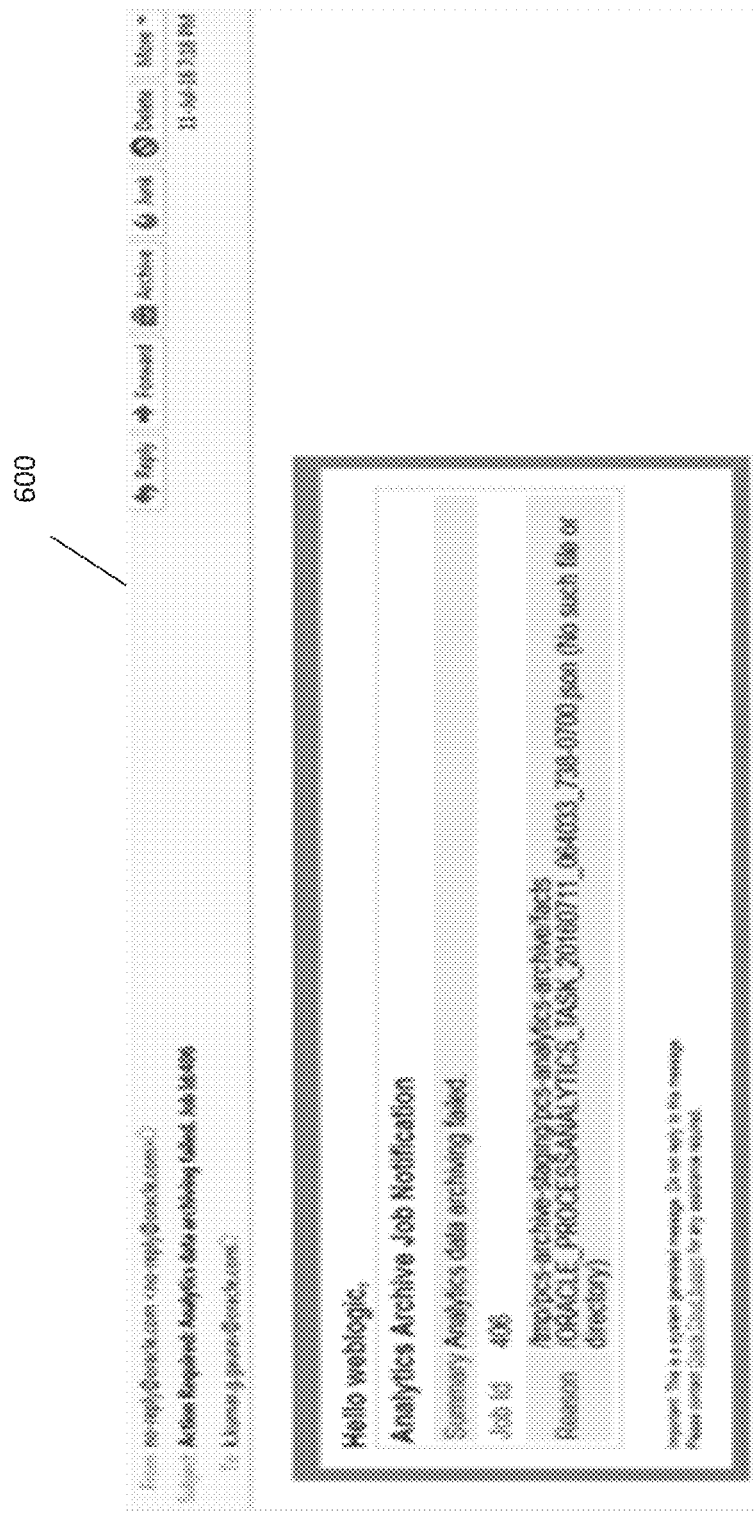
FIG. 6 depicts a block diagram of Job Failure Notification, according to one embodiment.

FIG. 6 depicts a block diagram of Job Failure Notification 600, according to one embodiment. Notification 600 is an example of a notification 141 (FIG. 1 and FIG. 2).

According to one embodiment, on failure of archiving PCS analytics data 142 to storage 308 (FIG. 3), the job status is marked as FAILED and a notification 600 is sent. The user reschedules another job 102 (FIG. 1) after resolving the issue.

An archive service uses a segmentation paradigm to archive PCS analytics data 142 (FIG. 1) to storage 308 (FIG. 3) and export the archive analytics data in storage 308. The export can occur, for example, every 30-60 seconds. A set of data records (also called a "block") of PCS analytics data 142 (FIG. 1) is pulled and archives are created, as discussed herein. A block includes 3K of data records. The archives are uploaded to storage 308 by storage service 118 (FIG. 1 and FIG. 3).

An example of a segmentation paradigm is if the amount of data to be archived is larger than any of the portions of storage 308 (FIG. 3), the data can be segmented to fit into the available portions of storage 308 and tracked so that the segments can be reassembled appropriately to re-create the data 142 (FIG. 1).

According to various embodiments, standardized interfaces are provided that include implementing the star schema data 305 (FIG. 3) and Representational State Transfer (REST) Application Programming Interfaces (APIs) 350 (FIG. 3) for accessing the star schema data 305 (FIG. 3). These standardized interfaces are provided for business intelligence systems 140 (FIG. 1) that are external to the system 100 (FIG. 1).

Further, according to various embodiments, a bridge in the form of REST APIs 350 (FIG. 3), as discussed herein, is provided so that a predefined BICS 117 (FIG. 1) can be used by customers seamlessly without the customers having to understand the internals of BICS 117 (FIG. 1). For example, the bridge, according to one embodiment, includes a semantic model 120 (FIG. 1) that defines the process in BI. This bridge interface enables any system, such as system 140 (FIG. 1), to communicate with BICS 117 (FIG. 1). The REST APIs 350 (FIG. 3) that provide at least part of this bridge are published, as discussed herein. The bridge is further provided by converting the PCS analytics data 142 (FIG. 1) into converted PCS data 144. The converted PCS data is in a format that BICS 117 (FIG. 1) understands, such as JSON, as discussed herein.

REST Resources, provided according to various embodiments, are published, according to one embodiment, as part of Business Process management (BPM) Representational State Transfer (REST) Application Programming Interfaces (APIs) 350 (FIG. 3). These REST resource can be used by customers 301 (FIG. 3) to fetch 309 (FIG. 3) archives 305 (FIG. 3) of their choice of PCS analytics data from the analytics star schema 308 using different filters.

The REST Resource is published for customer access, for example at /bpm/api/4.0/archives/analytics, and provide the following query parameters:

1) startDateFilter—Start Date Filter for listing the archives after that date, and 2) endDateFilter—End Date Filter for listing the archives till that date.

Archive Structure in Cloud Storage Service

Cloud storage services 118 (FIG. 1 and FIG. 3) provides an archive structure, such as the analytics star schema 305 (FIG. 3). According to one embodiment, the name of the container for storing the archived PCS data in the analytics star schema 305 is "pcs-analytics-archive" and the Object name would be "<timestamp>/artifact.zip" where artifact can be either facts, dimensions or application-specific.

For example, the archive structure could be as shownpcs-analytics-archives

|—2016-01-15_17:05:00.132/travelrequest.zip
|—2016-01-15_17:05:00.132/salesquote.zip
|—2016-01-15_17:05:00.132/dimensions.zip
|—2016-01-15_17:05:00.132/facts.zip When the environment has a tenant name stored in the System Property "oracle.pcs.tenantname" the container name is in the format: "<tenant_name>-pcs-analytics-archive" as shown below:

sbepaid160803102308-pcs-analytics-archive
|—20160804_094421_034+0000/applicationbics.zip
|—20160804_094421_034+0000/facts.zip
|—20160804_094421_034+0000/dimensions.zip In this illustration, "sbepaid160803102308" is the tenant name. If there is no tenant name, the container name could be "pcs-analytics-archive".

The timestamp format can be as shown in the above example, according to one embodiment. The timestamp format in this example is "yyyyMMdd_HHmmss_SSSZ" and the timestamp denotes the DATAOBJECT_MODIFIED timestamp of the last record archived in that job. In this illustration, examples of time stamps using this format are 20160804_094421_034+0000, 20160804_094421_034+0000, and 20160804_094421_034+0000.

Tables Created in Business Intelligence Cloud Service

Various embodiments provide tables 120 in BICS 117 (FIG. 1). The tables 120 are an example of a semantic model. BICS integration service 116 creates the tables 120 in BICS as a part of synchronizing the PCS analytics data 142 (FIG. 1) to BICS 117 (FIG. 1). The tables 120 are created in BICS 117 with the format <PREFIX>_<DATAOBJECT_NAME> as shown below:

BPM_PROCESS
BPM_PROCESS_DEFINITION

BPM_TASK
BPM_TRAVELAPP_ACTIVITY
BPM_TRAVELAPP_PROCESS

After review with the process managements (PMs) the default prefix i.e. "BPM" is changed, according to one embodiment, to "PCS." This prefix is user configurable, according to one embodiment, to avoid conflicts if two instances of PCS 130 (FIG. 1) (also referred to as "PCS instances") are using the same BICS account. Changing the default prefix from "BPM" to PCS" for the BICS 117's tables 120, makes it easier for customers to data mine PCS artifacts, for example, from the star schema data 305.

According to one embodiment, a standardized interface is provided that includes communicating with the analytics star schema 305 (FIG. 3). A star schema is a well-known database structuring methodology, which is very useful for performing analytics because it can be used for performing joins. A star schema typically includes a fact and related dimensions. The center piece of the star schema is the fact. The related dimensions are joined to that fact.

According to various embodiments, the standardized interfaces are created so that a predefined version of BICS 117 (FIG. 1) can be used by other BI systems, such as target BI system 140 (FIG. 1 and FIG. 3). The tables 120 created in BICS 117 have the names and columns. Thus, the BICS 117 (FIG. 1)'s tables 120 (FIG. 1), discussed herein, provide a semantic model for the customer so that it is ready for the customer 301 (FIG. 3) to design their dashboards.

Workspace

FIG. 7 depicts a block diagram of a page 700 of a user interface, according to one embodiment. According to one embodiment, the page 700 is part of Oracle™ Workspace. The page 700 is an administration and configuration page that exposes to a user an Oracle™ BICS. The page 700 allows administrators to enter BICS Instance URL 701 (the name of the target BI system 140 in FIG. 1) and corresponding credentials 702-704 for accessing BICS 117 (FIG. 1), which can be stored in BPMConfig MBeans against bicsInstanceURL property. The fields for specifying the credentials include a field 702 for entering a domain, a field 703 for entering a user name, and a field 704 for entering a password. Credentials can be stored in the Credential Store Framework (CSF). Credentials can be stored in the map "bpm.integration.credentials" with the key name "bpm.integration.bics". Workspace has a section to portray BICS Integration 116's (FIG. 1) status, according to one embodiment. The user can test the configuration provided by 701-704 by selecting the test button 705 to perform a test using pingServer( ) provided by IBICSIntService.java 203 depicted in FIG. 2.

Workspace User Interface

Figure 8:
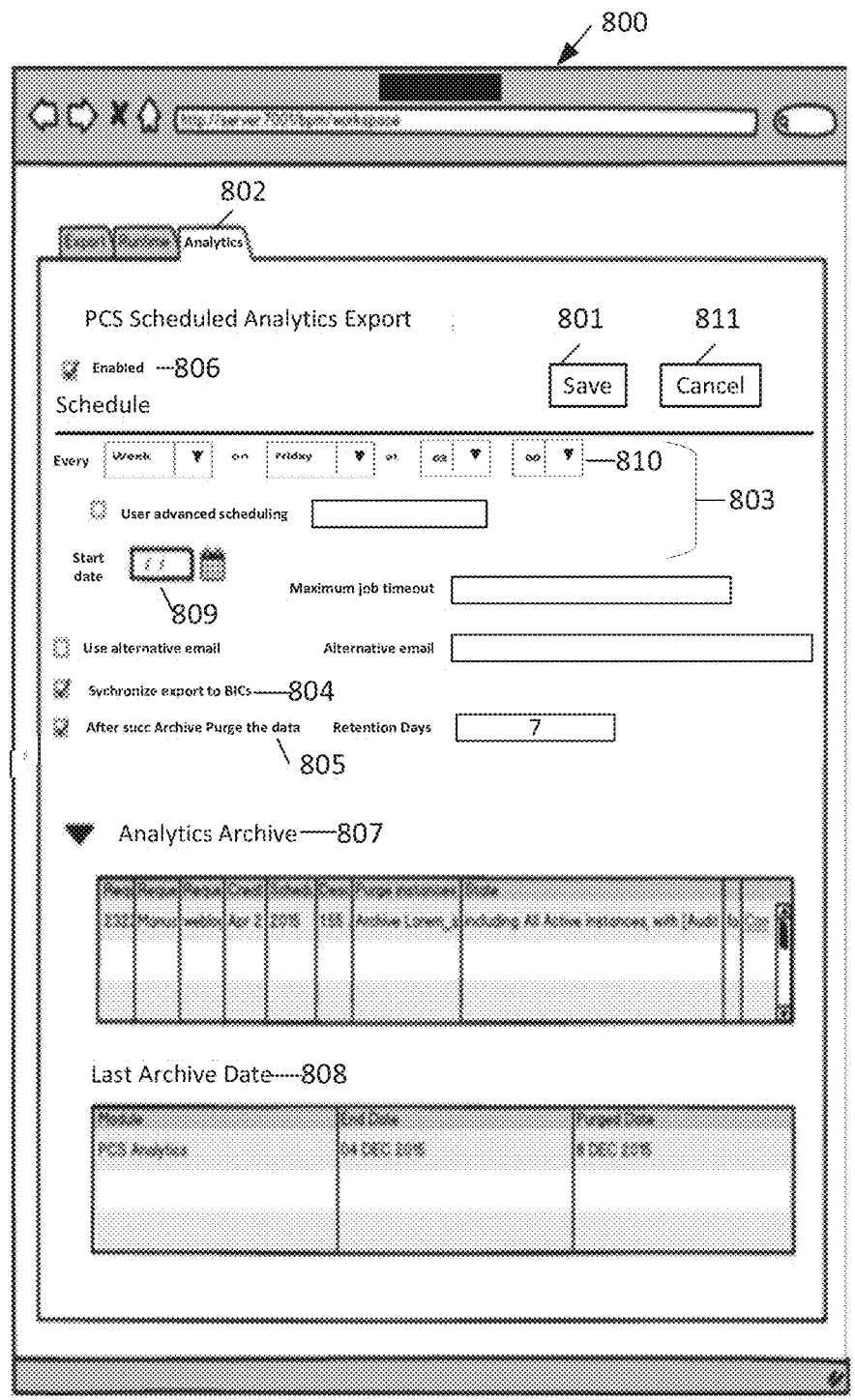
FIG. 8 depicts a block diagram of a workspace user interface, according to one embodiment.

FIG. 8 depicts a block diagram of a workspace user interface 800, according to one embodiment.

The user interface page 800 of FIG. 8 is used, according to one embodiment, to configure the PCS 130. Then the system job 102 that invokes the system 100 is started as configured by the user interface page 800. More specifically, the schedule 803 can include a start date 809 and a frequency 810. The start date 809 indicates when to start the system job 102. The frequency 810 indicates when to initiate the system job 102 after the start date 809 based on the "every," "on," and "at" parameters.

When the user clicks on the "Save" button 801 in the Analytics Archive Tab 802 with Enabled checkbox 806 checked, the schedule( ) method of the AnalyticsArchiveService is called, according to one embodiment, with a Map of key, value pairs the schedule ( ) method schedules the system job 102 (FIG. 1). A user is allowed to select the enable checkbox 806 after PCS 130 (FIG. 1) has been successfully configured, for example, using page 700 (FIG. 7). This checkbox 806 indicates the user has instructed PCS 130 (FIG. 1) to push PCS analytics data 142 (FIG. 1) to the BICS 117 (FIG. 1), as discussed herein.

When the user selects the save button 801, the system job 102 of FIG. 1 is scheduled based on the schedule 803. The system job 102 is then started on the start date 809, and also executed thereafter at the times indicated by the "every," "on," and "at" parameters specified in the frequency 810. More specifically, if these parameters indicate week, Friday at 3:00, then the system job 102 will cause PCS analytics data 142 (FIG. 1) to be provided to BICS 117 (FIG. 1) on every week, on Friday at 3:00 pm. Therefore, a scheduling method uses the schedule 803 to determine when to start the system job 102.

Referring to FIG. 1 and FIG. 8, the synchronize export to BICS checkbox 804 provides for the PCS analytics data 142 being synchronized, for example, by BICS integration service 116, converting the PCS analytics data 142 into converted PCS analytics data 144 that is in a format the BICS 117 understands, and then pushing the converted PCS analytics data 144 to BICS 117.

The after successful archive purge the data checkbox 805 indicates to the user that if they disable export, they are indirectly disabling purge 343 (FIG. 3) as well. The page 800, according to one embodiment, is used for both pushing PCS analytics data 142 to BICS 117 and for exporting, in order to provide reuse of logic, user interfaces and so on.

According to one embodiment, the analytics archive table 807 references the BPM_ARCHIVEREQUEST table. According to one embodiment, the last archive date 808 table references the SOA_ARCHIVE_PURGE_HISTORY table 105.

FIG. 9 depicts a table 3 with values that AnalyticsArchiveService uses from the UI 800, according to one embodiment.

The properties, as depicted in Table 3, are stored, according to one embodiment, as BPMNConfig MBean properties and have been exposed via ArchiveAttributeUtil for the UI 800 to use.

Table 3 of FIG. 9 includes columns 901-904 and rows 910. The columns include user interface description 901, key 902, getter for MBean property values 903, and MBean property name 904. Column 901 provides the description and Column 904 provides the name for the respective MBean properties in each of the rows 910. Column 903 provides the names of functions (also known as "getters" or "methods") that can be used to obtain the values for the respective MBean properties in each of the rows 910. Column 902 provides the keys for each of the respective MBean properties in each of the rows 910.

AnalyticsArchiveService can use the following values, depicted in Table 4, in the Map, according to one embodiment:

TABLE 4 values used by AnalyticsArchiveService,
according to one embodiment.

| Key | Value | Value Example |
|---|---|---|
| requester | Name of the user who scheduled the archive | weblogic |
| localeLanguage | Locale language of the user | en |
| localeCountry | Locale country of the user | US |

The schedule method that schedules the system job 102 (FIG. 1) has the map of the Mbean values used in pushing the PCS analytics data 142 (FIG. 1) to BICS 117 (FIG. 1) accordingly. According to one embodiment, the map is a value key pair indicating what values go with what parameters (keys).

Figure 10:
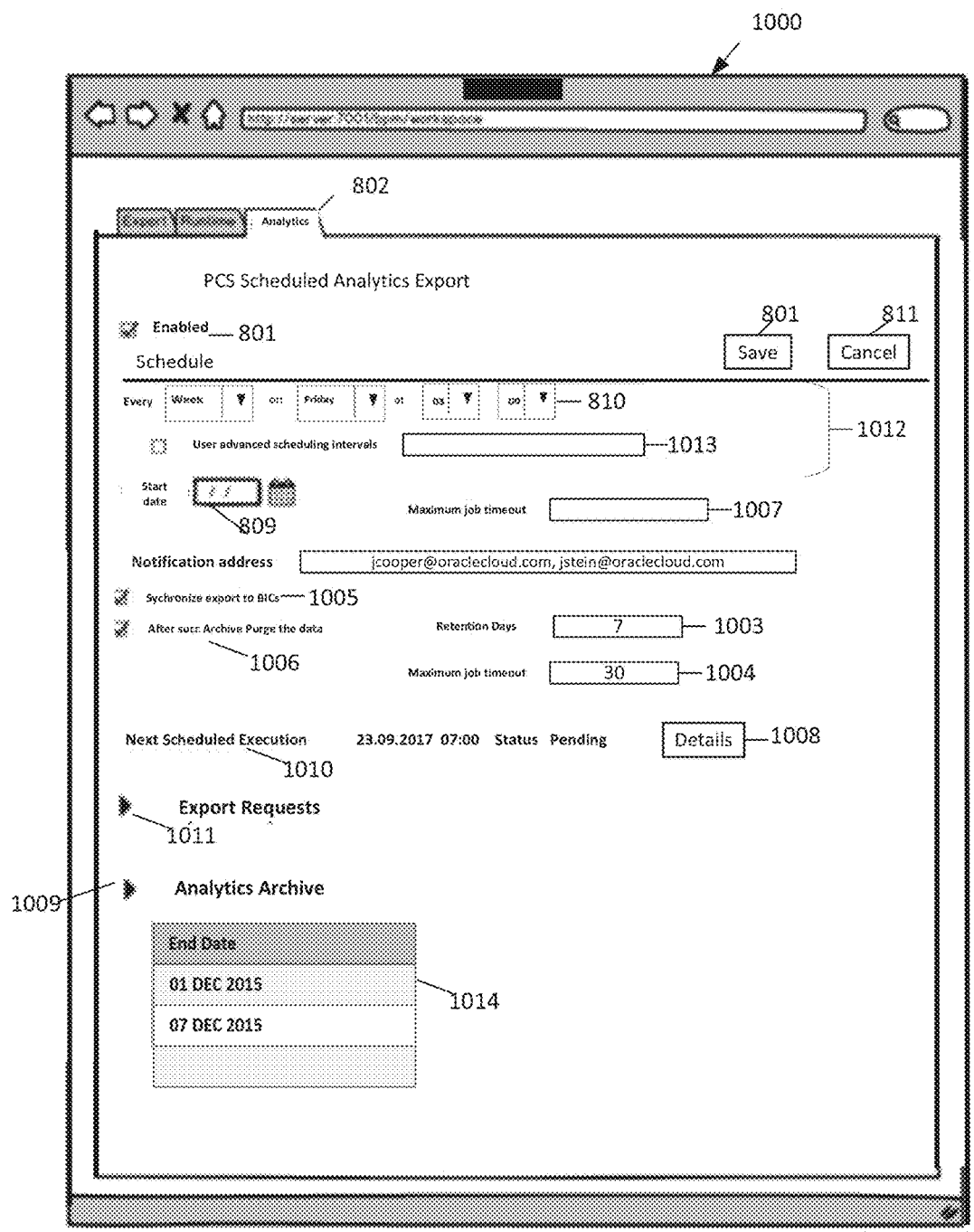
FIG. 10 depicts a PCS Scheduled Analytics Export page, according to one embodiment.

FIG. 10 depicts a PCS Scheduled Analytics Export page 1000, according to one embodiment.

The job 306 of FIG. 3, according to one embodiment, is configured with parameters obtained from page 1000.

The enabled checkbox 1001 enables the user to enable archive and purge, as discussed herein.

The schedule information 1002 is used, according to one embodiment, to provide the configured policy that configures the archive and associated purge, as discussed herein.

The schedule 1002 can be used to indicate when to start the archive job based on the start date 809 and a frequency 810 after the start date based on the "every," "on," and "at" parameters that are part of the schedule 1002. For example, if the start date 809 is Mar. 1, 2016 and the frequency 810 is every week, then the archive job 306 of FIG. 3 will be executed on Mar. 1, 2016 and every week thereafter.

The retention days field 1003 specifies how long data is retained in the star schema data 305 before the purge job 306 of FIG. 3 purges data from star schema data 305, as discussed herein. The eligibility criteria is used, as discussed herein.

The maximum job timeout field 1004 specifies how long to let the archive job 304 or the purge job 306 execute before timing them out. These jobs can be retried if they are timed out.

The synchronize export to BICS checkbox 1005 provides for the PCS analytics data 142 (FIG. 1) being synchronized, for example, by BICS integration service 116 (FIG. 1), converting the PCS analytics data 142 (FIG. 1) into converted PCS data 144 (FIG. 1) that is in a format the BICS 117 (FIG. 1) understands, and then pushing the converted PCS analytics data 144 to BICS 117.

The after successful archive purge the data checkbox 1006 indicates to the user that if they disable export, they are indirectly disabling purge as well. The page 1000, according to one embodiment, is used for archiving and for purging. The checkbox 1006 is used to request purging after a successful archive. A request 430 (FIG. 4) is generated as a result of checkbox 1006 being selected.

Notification address field 1007 can be used to specify one or more email addresses of people to provide status of the archive and/or purge. If an address is not provided in the field 1007, the system will use the email address of the user configuring the system 100 (FIG. 1). These emails can be used for determining who to send notifications 141 (FIG. 1) to.

Details button 1008 can be used to provide details on the archive and/or the purge.

Fields 1009 and 1011 are controls for displaying or hiding respectively export requests and last archive data.

Table 1014 displays one or more last archive dates. The information displayed in Table 1014 can be obtained from the SOA_PURGE_ARCHIVE_HISTORY table 105. The table 105 can be keyed by "MODULE" to show only the rows that are relevant to the current context.

The summary line 1010 depicts current scheduled job information. More details pertaining to the status of the currently scheduled job can be obtained by clicking on the details button 1008.

By default, the export requests table is hidden. The exports requests table can be shown by clicking on 1011.

When the user clicks on the save button 1012, a request 430 (FIG. 4) is generated based on the information from the page 1000 (FIG. 10) and the jobs 304 and 306 of FIG. 3 are scheduled based on the request 430.

The archive job 304 and the purge job 306 are separate jobs, according to one embodiment. However the user interface 1000 is used to configure both the archive job 304 and the purge job 306.

An archive service uses a segmentation paradigm to archive PCS analytics data 142 (FIG. 1) in storage 308 (FIG. 3) and export the archived analytics data in storage 308. The export can occur, for example, every 30-60 seconds. A set of data records (also called a "block") of PCS analytics data 142 (FIG. 1) is pulled and archives are created, as discussed herein. A block includes 3K of data records. The archives are uploaded to storage 308 (FIG. 3) by storage service 118 (FIG. 1 and FIG. 3) using one or more operations 1-12 depicted in FIG. 1.

An example of a segmentation paradigm is if the amount of data to be archived is larger than any of the portions of storage, the data can be segmented to fit into the available portions of storage and tracked so that the segments can be reassembled appropriately to re-create the data.

A user interface control is any item displayed on a user interface that a user can interact with. Examples of user interface controls include at least buttons, icons, tabs, check boxes, radio buttons, and drop down boxes. FIGS. 5-8 and 10 depict various user interface controls such as tabs for "export," "runtime," and "analytics," buttons for "save," and "cancel," check boxes for "enabled, and so on. Various user interface controls are also depicted in other figures, such as FIGS. 5-8 and 10.

Configuration Mbeans

According to one embodiment, there is an Mbean for each input that a user can provide from the configuration pages 700, 800 and 1000. According to one embodiment, the Mbean values are stored in persistent storage so that the values are preserved if the system 100 crashes or is intentionally rebooted. The persistent storage can be a database.

According to one embodiment, configuration Mbeans can be provided to customers at Oracle.soa.config:name=purge, type=AutoPurgeJobConfig,Application=soa-infra.

Table 5 below depicts the attribute names, the default values, and a description of the configuration Mbeans.

TABLE 5 attribute names, the default values, and a
description of the configuration Mbeans.

| Attribute Name | Default Value | Description |
|---|---|---|
| AutoEnableAnalyticsArchive | true | This flag is used to enable Analytics Archive Service |

TABLE 5-continued attribute names, the default values, and a
description of the configuration Mbeans.

| Attribute Name | Default Value | Description |
|---|---|---|
| isBiCSIntegrationEnabled | false | This flag indicates whether BiCS integration is enabled |
| isBicsIntegrationSuccessful | true | This flag portray whether BiCS data integration is successful |
| recipientEmailAddress | | email address(es) of stakeholder, who'll get notified via an email. It has have one or multiple email addresses with; as delimiter |
| AnalyticsArchiveCRONExpression | | CRON expression to trigger Analytics Export Job |
| Target URL Name | | The URL name for the target BI system |

If a recipientEmailAddress is not specified, the system 100 of FIG. 1 will use the email address of the user configuring the system 100 with either page 700, 800 or 1000.

Parameters from the user interface 1000 (FIG. 10) are stored, for example, in MBeans as depicted in Table 6. The MBeans are used to provide the configured policy and to configure the purge job 306 (FIG. 3), according to one embodiment.

TABLE 6

MBeans for user interface 1000 (FIG. 10)

| Mbean name | oracle.soa.config:name=purge,type= AutoPurgeJobConfig,Application= soa-infra | |
|---|---|---|
| Attribute: Schedule details | PurgeJobDetails.pcs_analytics_ purge_auto_job.executionSchedule | executionSchedule 'PurgeJobDetails' and 'pcs_analytics_purge_ auto_job' are of CompositeData type |
| Attribute: Enable/Disable job | PurgeJobDetails.pcs_analytics_ purge_auto_job.enable | |
| Attribute: Retention Period | PurgeJobDetails.pcs_analytics_ purge_auto_job. retentionPeriod | |
| Attribute: Max running time allowed | PurgeJobDetails.pcs_analytics_ purge_auto_job.maxRuntime | |

For editing the purge options, workspace can directly make one or more Java Management Extension (JMX) calls to update the PurgeJobMXBean, according to one embodiment.

Referring to FIG. 10 and Table 6, the schedule details MBean ($2^{nd}$ row of Table 6) is used for a field 1013 in the scheduling information 1002. The enable/disable job MBean ($3^{rd}$ row of Table 6) is used with check box 1001. The retention period MBean ($4^{th}$ row of Table 6) is used for field 1003. The Max running time allowed MBean ($5^{th}$ row of Table 6) is used for field 1004.

Exemplary Methods

Figure 11:
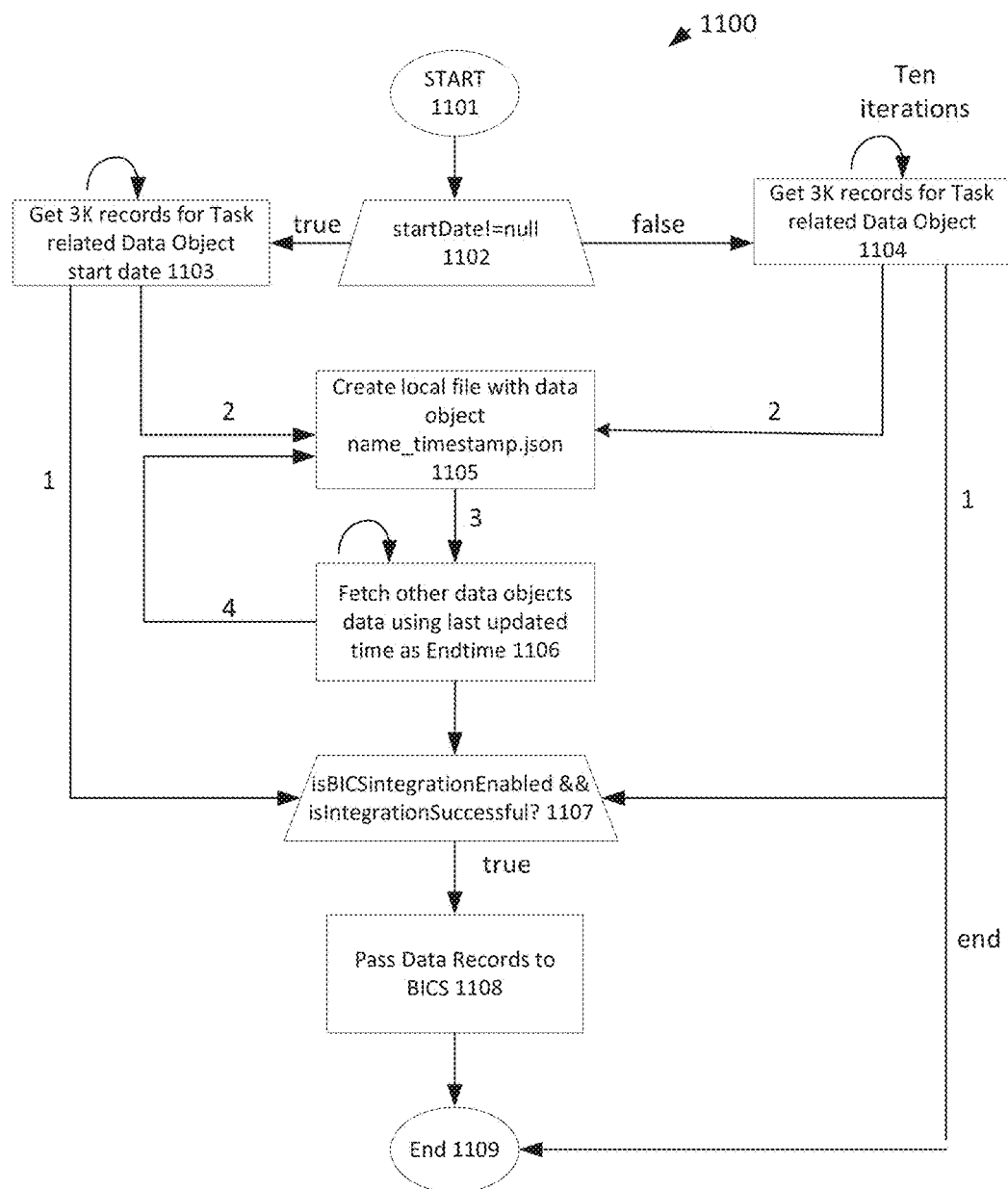
FIG. 11 depicts a flowchart of a method for pushing PCS data to BICS, according to one embodiment.

FIG. 11 depicts a flowchart of a method 1100 for pushing PCS data 142 (FIG. 1) to BICS 117 (FIG. 1), according to one embodiment.

At 1101, the method 1100 begins.

At 1102, a determination is made as to whether the start date 809 (FIG. 8) is available. For the first iteration of the job described by method 1100, the start date 809 (FIG. 8) may or may not be available. For subsequent iterations of the job, the ARCHIVE_DATE is obtained from SOA_PURGE_ARCHIVE_HISTORY table 105. If it is available, processing proceeds to 1103; otherwise, processing proceeds to 1104.

At 1103, a block of records for a task related data object is obtained for the given start date 809 (FIG. 8) that was determined at 1102. The size of the block of records may be 3K. Processing proceeds to 1105 and 1107. Control proceeds to 1105 if there are more large number records to be queried and archived. For example, the records can be written as a batch to a temporary area. The batch of records in the temporary area can be pushed to BICS. Control proceeds to 1107, if there are no further records after the first 10 iterations.

At 1104, a block of records for a task related data object is obtained. For example, a block of records for data 142 (FIG. 1). The first iteration of this job, as depicted by method 1100, is performed by 1103 and 1104. Processing proceeds to 1105 and 1107. Control proceeds to 1105 if there are more large number records to be queried and archived. For example, the records can be written as a batch to a temporary area. The batch of records in the temporary area can be pushed to BICS. Control proceeds to 1107, if there are no further records after the first 10 iterations.

At 1105, a local file is created with a data object name_timestamp.json. Processing proceeds to 1106. For example, the local file can be created in the local file system 112 (FIG. 1) with the data object name.

At 1106, other data objects are fetched using the last updated time as the end time. For example, other data objects of data 142 that were not archived since the last update time are fetched. Processing proceeds to 1107.

At 1107, the isBiCSIntegrationEnabled and isIntegrationSuccessful flags are checked. The isBiCSIntegrationEnabled and isIntegrationSuccessful flags are MBean attributes and are depicted in Table 5. If isBiCSIntegrationEnabled and isIntegrationSuccessful flags are both true, then processing proceeds to 1108; otherwise, processing proceeds to 1109. The value of isBiCSIntegrationEnabled is set from the workspace user interface (UI), such as user interface 800 (FIG. 8), as described herein. isIntegrationSuccessful will be true on job start i.e. beginning of job execution. Upon integration failure, isIntegrationSuccessful is set to false by integration service 116 (FIG. 1). isIntegrationSuccesful flag is reset to true at beginning of job iteration.

At 1108, the data records obtained, for example at 1103, 1104, 1106, are transmitted to the BICS 117. Processing proceeds to 1109 upon successful job execution.

At 1109, processing ends.

Referring to FIG. 1, when PCS data 142 is archived, it is written to memory 112, such as a heap. The PCS data 142 is stored in that memory 112 as a part of the PCS archival process. Further, as a part of the PCS archival process, the PCS data 142 is pushed from that memory 112 to BICS 117. To maintain data consistency while pushing the PCS data 142 from that memory, BICS integrations service 116 processes records in sequential order, according to one embodiment. The archive can be performed synchronously or asynchronously.

According to one embodiment, the asynchronous paradigm is provided by invoking BICS data sync API using Executor Services, i.e. using LinkedBlockingQueue, with min and max thread pool size=1. In this case, the performance is fast and an infrastructure such as Java Message Service (JMS) queue or KAFKA, may not be needed. Since LinkedBlockingQueue is an in memory queue, messages may be lost upon system crash or down for maintenance.

According to anther embodiment, the asynchronous paradigm is provided using JMS queue i.e. a JMS distributed queue with initial-beans=1 and max beans=1. This approach may provide loose coupling, may be fast, reliable, and easy to setup. This approach uses an infrastructure.

According to yet another embodiment, the asynchronous paradigm may be provided using Apache's Kafka Infrastructure. This approach may provide loose coupling and may be fast and reliable.

Figure 12:
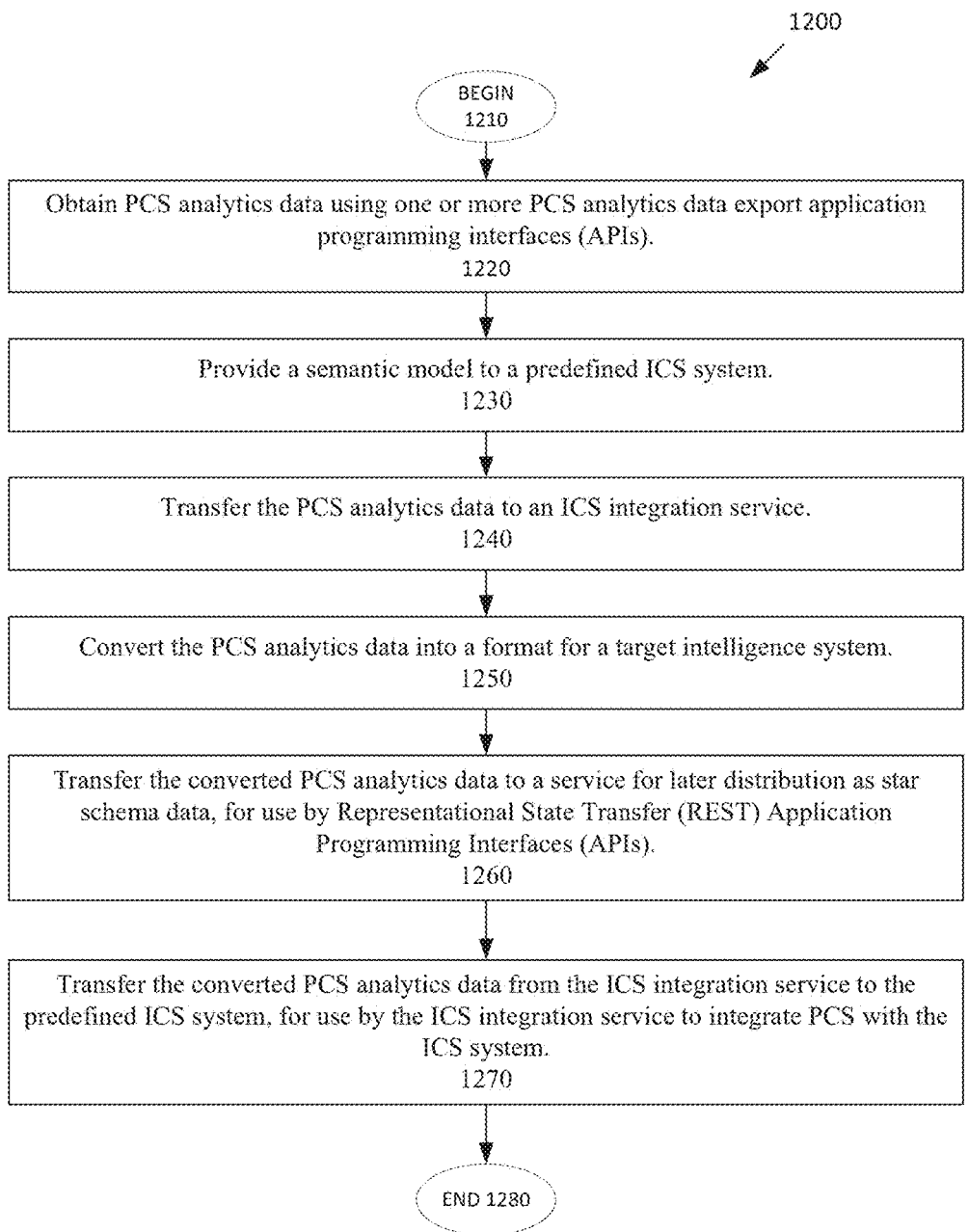
FIG. 12 depicts a flowchart for a method of integrating process cloud services (PCS) with business intelligence cloud services (BICS), according to one embodiment.

FIG. 12 depicts a flowchart 1200 for a method of integrating PCS 130 (FIG. 1) with BICS 117 (FIG. 1), according to one embodiment.

At 1210, the method begins.

At 1220, obtain PCS analytics data using one or more PCS analytics data export application programming interfaces (APIs).

For example, referring to FIG. 1, operations 1-3 depicted in FIG. 1 can be used for obtaining PCS analytics data 142 using the PCS Analytics Data Export APIs 115. More specifically, referring to FIG. 1, job start 102 invokes execute( ) in ArchiveAnalyticsJob 104. Execute( ) will invoke prepareStaging( ) and archive( ) in AnalyticsArchiveBuilder 107. Archive( ) method of AnalyticsArchiveBuilder 107 invokes the writeOutContent( ) method of AnalyticsContentProvider 111. WriteOutContent( ) obtains the data 142 from the Analytics Data Export APIs 115 for the respective DataObjects.

At 1230, provide a semantic model to a predefined ICS system.

An example of a predefined ICS system is BICS 117 (FIG. 1). The tables 120 (FIG. 1) are an example of a semantic model. According to one embodiment, the synchronization of PCS analytics data 142 (FIG. 1) to BICS 117 (FIG. 1) creates tables 120 in BICS 117.

At 1240, transfer the PCS analytics data to an ICS integration service.

An example of ICS integration service is BICS integration 116 (FIG. 1).

Referring to FIG. 1, the PCS analytics data 142 is transferred to ICS integration services 116, for example, with operations 4 and 5 depicted in FIG. 1. More specifically, writeOutContent( ) writes the PCS analytics data 142 to the local staging area, provided by local filesystem 112. A thread is spawned for transferring the same PCS analytics data 142 to BICS Integration service 116.

At 1250, convert the PCS analytics data into a format for a target intelligence system.

For example, BICS integration service 116 converts the PCS analytics data 142 into a format that BICS 117 and the target intelligence system 140 understand and then provides the converted PCS analytics data 144 to BICS 117. The PCS analytics data 142 is converted into a Java Script object Notation (JSON) format.

At 1260, transfer the converted PCS analytics data to a service for later distribution as star schema data, for use by Representational State Transfer (REST) Application Programming Interfaces (APIs).

An example of a service that the converted PCS analytics data 144 (FIG. 1) is transferred to for later distribution is cloud storage service 118. Examples of the REST APIs are REST APIs 350 (FIG. 3). The REST APIs 350 (FIG. 3) are used for distributing portions of the star schema data 305 (FIG. 3) to a target BI system 140 (FIG. 3).

At 1270, transfer the converted PCS analytics data from the ICS integration service to the predefined ICS system, for use by the ICS integration service to integrate PCS with the ICS system.

For example, referring to FIG. 1, operation 6 can be used to transfer the converted PCS analytics data 144 from the ICS integration service 116 to the predefined ICS system 117. Thus, the converting in 1250 and the transferring in 1270 enable the ICS integration service 116 to integrate PCS 130 and the ICS system 117.

More specifically, referring to FIG. 1 and FIG. 3, the BICS integration service 116 pushes the PCS analytics data to BICS 117. PCS 130 publishes Representational State Transfer (REST) Application Programming Interfaces (APIs) 350 so that an entity outside of the system 100 can use the REST APIs 350 to retrieve 330 the PCS analytics data 142 from the BICS 117. Target BI system 140 is an example of an entity that is outside of the system 100.

Referring to FIG. 3, REST APIs 350 that are published for the customer 301 to retrieve 330 the PCS analytics data from the analytics star schema 305 use the following query parameters:

startDateFilter—Start Date Filter for listing the archives after that date, and endDateFilter—End Date Filter for listing the archives till that date.

PCS 130 publishes the REST APIs 350 and they are used by the UI 310. The REST APIs are published to a location, such as /bpm/api/4.0/archives/analytics, on the Internet.

At 1280, the method ends.

An embodiment provides for publishing the REST APIs. For example, referring to FIGS. 1 and 3, PCS 130 publishes REST APIs 350 that are used by a user interface 310.

An embodiment provides for publishing the REST APIs with query parameters for listing archives from the star schema data after a start date and for listing archives from the star schema data till an end date. For example, the REST APIs 350 (FIG. 3) can have query parameters, such as startDateFilter—Start Date Filter for listing the archives after that date, and endDateFilter—End Date Filter for listing the archives till that date.

An embodiment provides for receiving a request, from the target intelligence system, for a portion of the PCS analytics data from the star schema data, wherein a published REST API is used for the request; and providing the portion of the PCS analytics data from the star schema data to the target intelligence system in response to the request from the published REST API. For example, an embodiment provides for receiving a request 430 (FIG. 3), from the target intelligence system 140 (FIG. 1 and FIG. 3), for a portion of the PCS analytics data from the star schema data 305 (FIG. 3), wherein a published REST API 350 (FIG. 3) is used for the request; and providing the portion of the PCS analytics data from the star schema data to the target intelligence system in response to the request from the published REST API.

According to one embodiment, the target intelligence system is outside of an analytics archive and export service system that includes the PCS and the predefined ICS system. For example, the target intelligence system 140 (FIGS. 1 and 3) is outside of an analytics archive and export service system 100 (FIG. 1) that includes the PCS 130 (FIG. 1) and the predefined ICS system 117 (FIG. 1).

An embodiment provides for creating the semantic model in the predefined ICS system as part of synchronizing the PCS analytics data to the predefined ICs system, wherein the semantic model includes tables with a format <PREFIX>_<DATAOBJECT_NAME>. For example, an embodiment provides for creating the semantic model 120 (FIG. 1) in the predefined ICS system 117 (FIG. 1) as part of synchronizing the PCS analytics data 142 (FIG. 1) to the predefined ICs system, wherein the semantic model includes tables with a format <PREFIX>_<DATAOBJECT_NAME>.

According to one embodiment, the predefined ICS system is a business intelligence cloud service (BICS) 117 (FIG. 1).

According to one embodiment, the format is Java Script object Notation (JSON) format.

Process Star Schema Data Management for Cloud Based Intelligence

Various embodiments pertain to managing star schema data 305 (FIG. 3) in cloud based intelligence 118 (FIG. 3). Although various embodiments are described in the context of business intelligence, the cloud based intelligence may or may not be business related.

Various embodiments provide configurable and automated pattern to optimize precious database resources while providing complete standardized access to process star schema data using standard based analytics Representational State Transfer Application Programming Interfaces (REST APIS) with query parameters, such as startDateFilter and endDateFilter, discussed herein. This enables correlated analytics on process data. Thus, according to one embodiment, a cloud service 118 (FIG. 3) to work with the space constraints for their database star schema 305 (FIG. 3) and at the same time, allow a way for the customers 305 (FIG. 3) to get full access to historical data from the analytics star schema 305 (FIG. 3). Referring to FIG. 1 and FIG. 3, various embodiments provide one or more of the following operations:

a) Periodically export incremental archives for the data 305 (FIG. 3) updated between last archive time stamp to current time stamp. For example, incremental archives 305 stored in storage 308 are periodically exported.

Star schema data 305 is exported in Java Script object Notation (JSON) format with a well-defined JSON schema. This will allow the JSON data to be easily interpreted by any JSON parser.
  To reduce the size of exported data, the JSON data files (e.g zip, tar.gz etc) are compressed into compressed files 143 (FIG. 1) and the archive 305 (FIG. 3) is created from the compressed files 143.

b) The archives 305 (FIG. 3) are by a cloud based storage service 118 (FIG. 3). The archives are organized in storage service to allow for search based on application names and timestamp ranges.

c) Based on configured policy, the non-update-able old data is regular purged from star schema data 305 (FIG. 3). Hence, storage 308's (FIG. 3) space is freed up. The configured policy is configured, for example, using the user interface 1000, as depicted in FIG. 10.

d) The REST APIs 350 are exposed to allow searches (by name, timestamp etc) and downloads 330 of archives 305 (FIG. 3).

e) The archives 305 (FIG. 3) can be downloaded 330 (FIG. 3) and published 309 (FIG. 3) or restored to any cloud business intelligence store or on-premise business intelligence store, such as target BI system 140. JSON data in an archive 305 (FIG. 3) can be read using any standard JSON parser for processing.

Referring to FIG. 1, various embodiments pertain to process task data management from cloud based intelligence. For example, when a cloud service, such as process cloud services (PCS) 130 is provisioned for a customer, the cloud service 130 will have its own configuration, for example, about how much data 142 it can support, how much processing power or bandwidth it can provide. Various embodiments pertain to providing the best value add to the customer for what they have paid while dealing with these various types of configurations. For example, a cloud service 130 typically provides a fixed amount of data to a customer. Examples of this fixed amount of storage are 50 kilobytes or 100 kilobytes. The amount of data increases as the customer's business processes execute. Customers want to continue to improve their expensive approval processes. At the same time for their own audit purpose and analytics purpose, the old data becomes more and more valuable. The data can be used for trend analysis and predictive analysis. A simple illustration of this is performing an historical analysis on the analytics data. Various embodiments provide a way for a customer not only to run their business but to also run their business efficiently with these resource limitations that any process in any PCS 130 comes with.

Various embodiments provide efficient data management protocol or a mechanism based on which the system continues to accept new processes and new data and then also have a way to get rid of old data which is no longer needed. Thus, space for new data is provided. A customer can use that data, push the data to a different system, and/or perform interesting analysis on that data.

In the context of PCS 130, various embodiments provide a inbuilt process task schema. Predefined dash boards and some set of customer dashboarding can be used. Various embodiments enable operational monitoring. Examples of operation monitoring are monitoring workloads and providing historical analysis. The historical analysis may be for a certain previous portion of historical data, such as the previous last month of data.

Referring to FIGS. 1 and 3, as the data continues to be collected in the analytics star schema 305 (FIG. 3), the size of data continues to increase. Customers can manage their data, for example, by using a user interface, such as user interface 1000 (FIG. 10), to configure the archival process, for example, by specifying how and what data 142 (FIG. 1) that they want to archive. They can start to archive new process schema data based on this configuration. In the case of PCS 130 (FIG. 1), a back end storage service 308 (FIG. 3) that is separate from the database 105 is provided, according to various embodiments. Examples of the back end storage service are a file storage service or object storage. This back end storage provides, according to one embodiment, a "by default provision" for customers 301 (FIG. 3) without them knowing about it because it is used internally by PCS 130 (FIG. 1). The back end storage 308 (FIG. 3) is used for archiving of the process star schema data 305 (FIG. 3).

According to one embodiment, the customer can configure how data 142 (FIG. 1) is archived, for example, when it reaches a terminal state. Data 142 (FIG. 1) has reached its terminal state when the process instance(es) using that data 142 (FIG. 1) has/have completed performing operations on that data 142 (FIG. 1). Examples of process instances are order approvals and expense approvals. An archive is created out of the terminal data and the terminal data is pushed to storage service 118 (FIG. 1 and FIG. 3), as discussed herein.

When pushing the data 142 (FIG. 1) to a storage service 118 (FIG. 1), two things can be provided. Number one is that archives are organized in a way that they are searchable in the storage service 118 (FIG. 1). For example, the archived data 305 (FIG. 3) may be organized by time stamp or by the application name. Therefore, a customer can easily identify that an archive 305 (FIG. 3) belongs to expense approval or that an archive 305 contains an expense approval from a specified time stamp. This allows a search 330 (FIG. 3) to be performed on the storage service 118 (FIG. 3). A search 330 can provide all of the archived expensive approval analytics data during a specified period of time. Number two, the collected data is organized within each archive 305 (FIG. 3) in a standard format that conforms to a standard interface, such as JSON. Anyone can write a parser or obtain a readily available parser that understands the data 305 (FIG. 3). Various embodiments provide a JSON schema for the data 305 so that the data 305 can be easily understood, parsed, and processed, for example, by a business intelligence (BI) tool of the target BI system 140 (FIG. 3). Any JSON parser can parse the data 305 (FIG. 3) because it is in JSON format.

Continuing to refer to FIG. 1 and FIG. 3, interfaces are provided for downloading and searching 330 the archives 305. Examples of the interfaces are the REST APIS 350 with the query parameters startDateFilter and/or endDateFilter, as discussed herein. Archives 305 can be pushed to any target BI tool of system 140 that a customer 301 chooses. Archived data 305 can be published 309 to a BI tool in the target BI system 140 of the customer 301's choice. The REST APIs 350 can be used to search 330 the archives 305 and download data from the archives 305 to the BI tool. Data from the archive 305 can be incrementally downloaded to a BI tool, for example, where the incremental backups pertain to the data in the analytics star schema 305 that was modified since the last incremental backup. The BI tool can perform analysis on the downloaded data, as describe herein. The BI tool can subscribe to receiving archived data from the analytics star schema 305.

According to one embodiment, a mechanism is provided in a PCS server for purging 343 the analytics data 305 from the storage 308 in a scheduled fashion. According to one embodiment, it is used for limiting the default database size, such as 50 gigabytes (GB), which comes with a regular PCS POD. A POD includes one or more virtual machines (VMs) that can be or are assigned to a PCS instance. As part of a purge, according to one embodiment, a schedule job regularly purges 343 all instances that are in terminal state because the instances have exceeded their retention age.

According to one embodiment, purge eligibility is determined based on the factors that (1) the data 305 has been archived in storage 308, (2) the retention period of the data 305 in storage 308, and (3) whether the data 305 and corresponding process executed in PCS 130 are in a terminal state.

More specifically, only data 305 which has been already archived will be purged, according to one embodiment. This will be determined using "SOA_ARCHIVE_PURGE_HISTORY" table 105 (FIG. 1). When a purge job 306 starts, it will obtain a matching record having a least archival date for each class of data object and attempt to purge it. As will become more evident, according to one embodiment, a database query 307 is used for determining what data is eligible for being purged from the schema 305. The query 307 is a select statement specifying the minimum archive date obtained from the SOA_ARCHIVE_PURGE_HISTORY table 105.

A configurable retention period (default value of 30 days) is used to control, according to one embodiment, the period of time after which record of the process star schema 305 will be purged after it was last updated. In the backend, the retention period will be set to the PurgeMXBean mbean's "AnalyticsPurgeJobsetentionPeriod" parameter. AnalyticsPurgeJob refers to PurgeJobDetails.pcs_analtyics_purge_auto_job in Table 6.

Further, purge eligibility criteria is provided for process Instance or Process Definition corresponding to a Data object record that is in terminal state, as indicated in Table 7 below.

TABLE 7

Terminal states of processes

| | TERMINAL STATE |
|---|---|
| Process | COMPLETED |
| | ABORTED |
| | FAULTED and non-recoverable |
| Process Definition | Undeployed |

According to one embodiment, data 305 meets the following three purge eligibility criteria in order to be eligible for being purged: (1) the data was archived, (2) the data was retained for specified amount of time (see retention days field 1003 in FIG. 10) before it is purged, and (3) the data is in a terminal state, as discussed herein.

Figure 13:
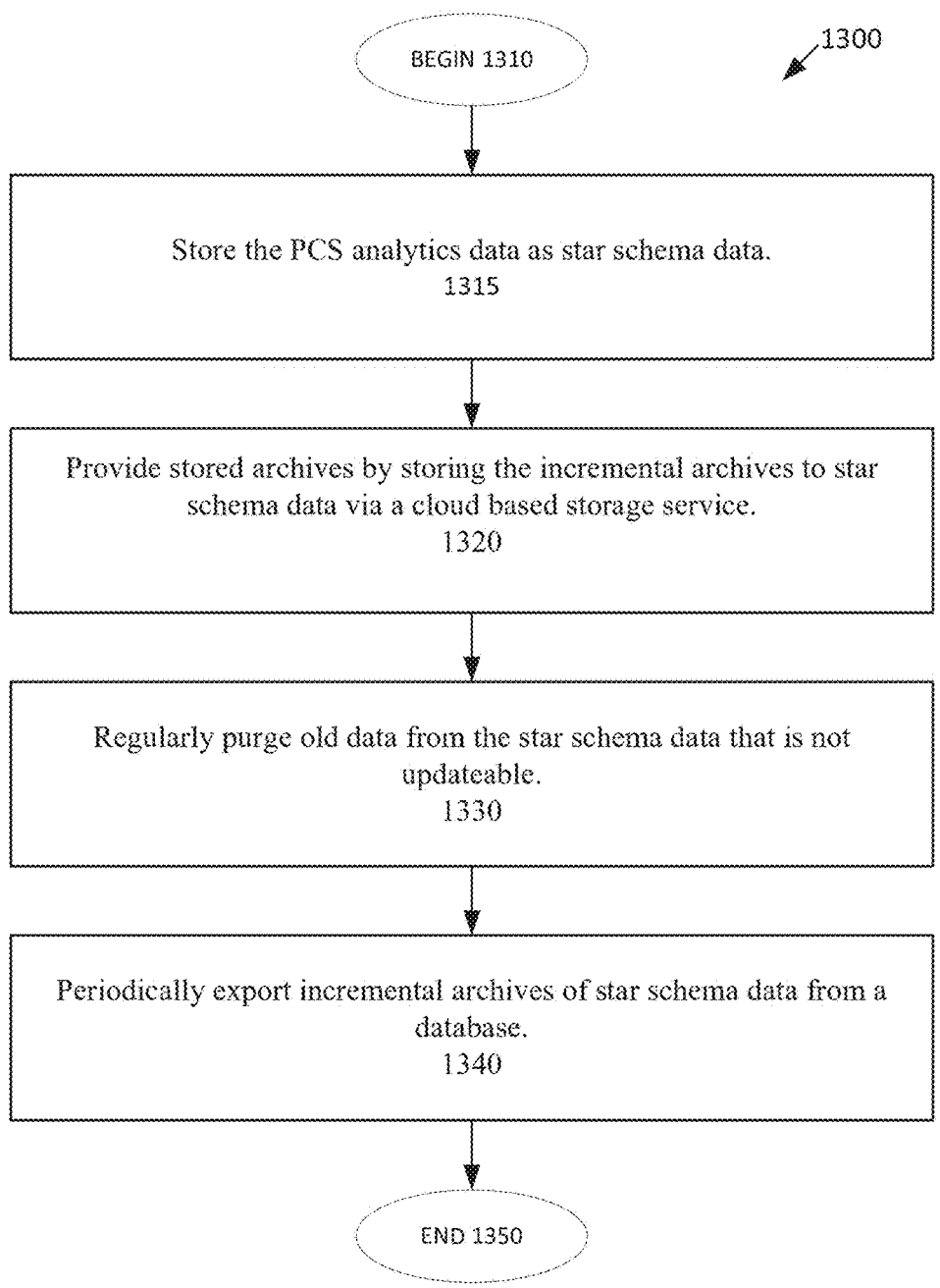
FIG. 13 depicts a flowchart of a method for managing star schema data in cloud based business intelligence, according to one embodiment.

FIG. 13 depicts a flowchart of a method 1300 for of managing star schema data 305 in cloud based intelligence, according to one embodiment.

At 1310, the method begins.

At 1315, store the PCS analytics data as star schema data. For example, operations 10 and 11 (FIG. 1) can be used for storing PCS analytics data 142 (FIG. 1) as star schema data 305 (FIG. 3. More specifically, the PCS analytics data 142 (FIG. 1) received by the cloud storage service 118 (FIG. 1) is stored in storage 308 (FIG. 3) as star schema data 305 (FIG. 3).

At 1320, provide stored archives by storing the incremental archives to star schema data via a cloud based storage service. For example, operations 1-12 depicted in FIG. 1 can be used to provide incremental archives to the star schema data 305 (FIG. 3) via the storage service 118 (FIG. 1). The stored archives 305 (FIG. 3) are provided by storing the incremental archives of the PCS analytics data 142 (FIG. 1) in the star schema data 305 (FIG. 3) via the cloud based storage service 118 (FIG. 1).

At 1330, regularly purge old data from the star schema data that is not updateable. According to one embodiment, the purge eligibility criteria is used for determining what old data in the star schema 305 (FIG. 3) is eligible to be purged 343 (FIG. 3), as discussed herein. For example, data 305 (FIG. 3) meets the following three purge eligibility criteria in order to be eligible for being purged: (1) the data 305 was archived, (2) the data 305 was retained for specified amount of time (see retention days field 103) before it is purged, and (3) the data 305 is in a terminal state, as discussed herein.

At 1340, periodically export incremental archives of star schema data from a database. For example, the star schema data 305 (FIG. 3) is updated between a last archive time stamp and a current time stamp. Periodically incremental archives of star schema data 305 (FIG. 3) are exported from the database 308 (FIG. 3). The incremental archives are exported from the star schema data 305 (FIG. 3) in a Java Script object Notation (JSON) format.

At 1350, the method ends.

An embodiment provides for wherein the method further comprises: providing Representational State Transfer Application Programming Interfaces (REST APIs) 350 for accessing the stored archives with. Star schema 305 (FIG. 3) is an example of stored archives.

An embodiment provides for wherein the incremental archives are in Java Script object Notation (JSON) format and wherein the periodically exporting further comprises: exporting the incremental archives in Java Script object Notation (JSON) format. Star schema 305 (FIG. 3) is an example of an archive that has incremental archives in it.

An embodiment provides for wherein the method further comprises: interpreting the star schema data with a JSON parser.

An embodiment provides for wherein the method further comprises: compressing the incremental archives which are in Java Script Object Notation format.

An embodiment provides for wherein the method further comprises: compressing the incremental archives in JSON format into another format selected from a group consisting of zip and tar.gz.

An embodiment provides for wherein the providing stored archives further comprises: organizing the stored archives by application names and timestamp ranges.

An embodiment provides for receiving an application name and a timestamp range at a REST API; searching the stored archives based on the application name and the timestamp range; and determining a stored archive based on the searching. Referring to FIG. 3, operation 330 is an example of searching for stored archives 305. Examples of REST API query parameters include startDateFilter and endDateFilter, as discussed herein.

An embodiment provides for wherein the method further comprises further comprises: downloading the stored archive. Operation 330 in FIG. 3 is an example of downloading and the analytics star schema 305 is an example of a stored archive.

An embodiment provides for wherein the method further comprises: publishing the stored archive to an intelligence store. The intelligence store may be a business intelligence store. For example, FIG. 3 depicts publishing 309 stored archives 305 to an intelligence store 140.

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor, such as a central processing unit, associated with the computer system. The tangible processor-readable storage device is hardware memory and the one or more processors are hardware processors.

Various embodiments provide for a tangible processor-readable storage device that performs a method of integrating process cloud services (PCS) with intelligence cloud service (ICS), wherein the tangible processor-readable storage device includes instructions executable by one or more processors for: obtaining PCS analytics data using one or more PCS analytics data export application programming interfaces (APIs); providing a semantic model to a predefined ICS system; transferring the PCS analytics data to an ICS integration service; converting the PCS analytics data into a format for a target intelligence system; transferring the converted PCS analytics data to a service for later distribution as star schema data, for use by Representational State Transfer (REST) Application Programming Interfaces (APIs); and transferring the PCS analytics data from the ICS integration service to the predefined ICS system, for use by the ICS integration service to integrate PCS with the ICS system Various embodiments provide an apparatus comprising: one or more processors; and a tangible processor-readable storage device including instructions for: obtaining PCS analytics data using one or more PCS analytics data export application programming interfaces (APIs); providing a semantic model to a predefined ICS system; transferring the PCS analytics data to an ICS integration service; converting the PCS analytics data into a format for a target intelligence system; transferring the converted PCS analytics data to a service for later distribution as star schema data, for use by Representational State Transfer (REST) Application Programming Interfaces (APIs); and transferring the PCS analytics data from the ICS integration service to the predefined ICS system, for use by the ICS integration service to integrate PCS with the ICS system.

System and Accompanying Computing Environment

Figure 14:
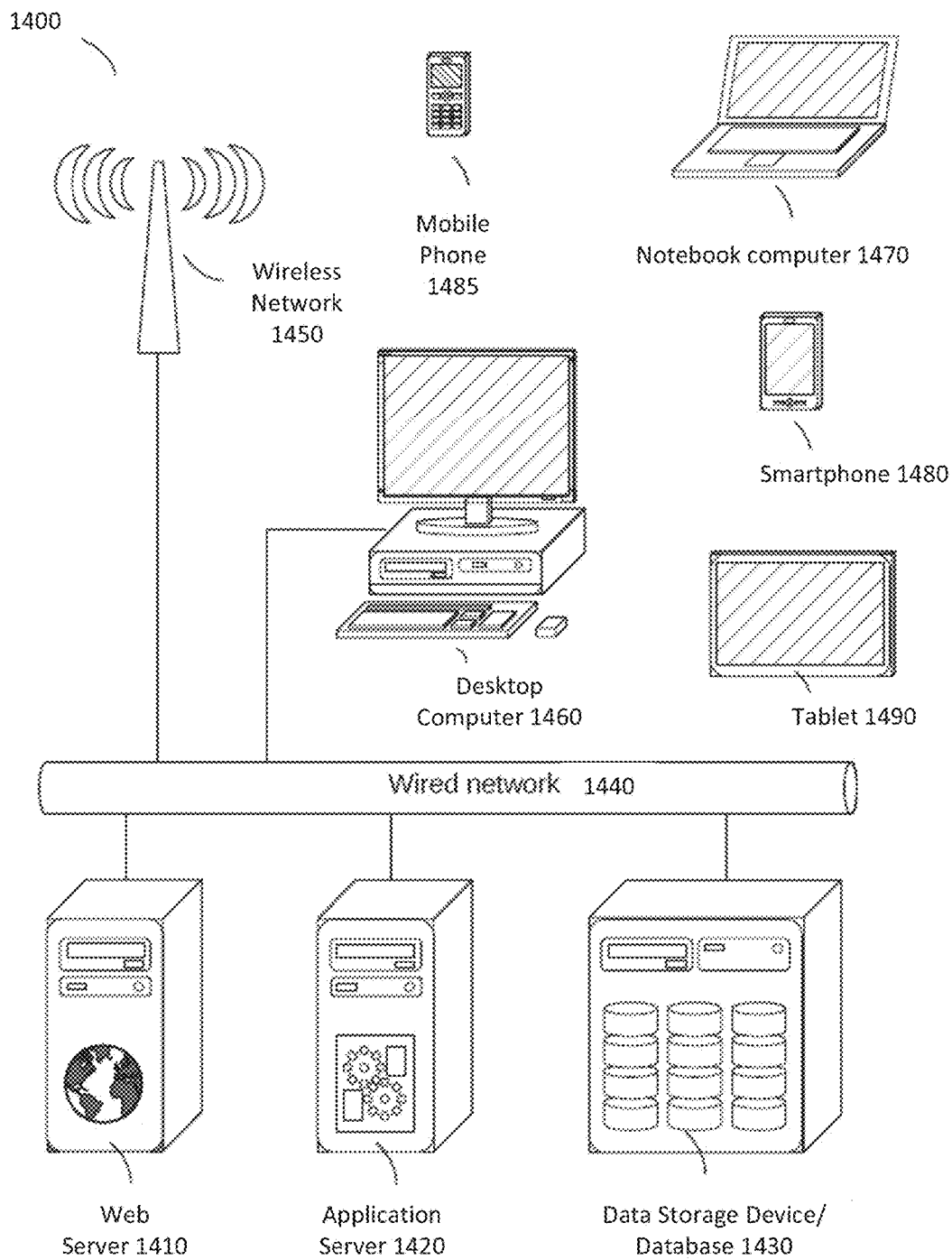
FIG. 14 is a general block diagram of a system and accompanying computing environment usable to implement the embodiments of FIGS. 1-13.

FIG. 14 is a general block diagram of a system and accompanying computing environment usable to implement various embodiments.

The example system 1400 of FIG. 14 and the accompanying computing environment can be used to implement the embodiments of FIGS. 1-13. The example system 1400 is capable of supporting or running various hardware and/or software modules and associated methods discussed with reference to FIGS. 1-13. Note that certain embodiments may be implemented using one or more standalone applications (for example, residing in a user device) and/or one or more web-based applications implemented using a combination of client-side and server-side code. FIG. 14 is but one illustration of basic components in a system capable of executing features described herein. Many other variations on this system, or different systems, may also be used, as desired.

The general system 1400 includes user devices 1460-1490, including desktop computers 1460, notebook computers 1470, smartphones 1480, mobile phones 1485, and tablets 1490. The general system 1400 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1400 is shown with five user devices, any number of user devices can be supported.

A web server 1410 is used to process requests from web browsers and standalone applications for web pages, electronic documents, enterprise data or other content, and other data from the user computers. The web server 1410 may also provide push data or syndicated content, such as RSS feeds, of data related to enterprise operations.

An application server 1420 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 1420 are adapted to process input data and user computer requests and can store or retrieve data from data storage device or database 1430. Database 1430 stores data created and used by the data applications. In an embodiment, the database 1430 includes a relational database that is adapted to store, update, and retrieve data in response to SQL format commands or other database query languages. Other embodiments may use unstructured data storage architectures and NoSQL (Not Only SQL) databases.

In an embodiment, the application server 1420 includes one or more general-purpose computers capable of executing programs or scripts. In an embodiment, web server 1410 is implemented as an application running on the one or more general-purpose computers. The web server 1410 and application server 1420 may be combined and executed on the same computers.

An electronic communication network 1440-1450 enables communication between user computers 1460-1490, web server 1410, application server 1420, and database 1430. In an embodiment, networks 1440-1450 may further include any form of electrical or optical communication devices, including wired network 1440 and wireless network 1450. Networks 1440-1450 may also incorporate one or more local-area networks, such as an Ethernet network, wide-area networks, such as the Internet; cellular carrier data networks; and virtual networks, such as a virtual private network.

The system 1400 is one example for executing applications according to an embodiment of the invention. In another embodiment, application server 1410, web server 1420, and optionally database 1430 can be combined into a single server computer application and system. In a further embodiment, virtualization and virtual machine applications may be used to implement one or more of the application server 1410, web server 1420, and database 1430.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1, 2, 3 and 4, the features 102-118, 201-204, 304-307, and 410 and 308 may be implemented in whole or in part via one or more of the desktop computer 1460, notebook computer 1470, smartphone 1480, mobile phone 1485, tablet 1490, of FIG. 14 and/or other computing devices. In a particular example embodiment, the computing devices 1460-1490 run browsers, e.g., used to display the user interfaces shown on FIGS. 5, 6, 7, 8 and 12.

In a particular example embodiment, browsers of the computing devices 1460-1490 executing user interfaces shown on FIGS. 5, 6, 7, 8 and 12, connect to the Internet, represented by the wired network 1440 and/or wireless network 1450 as shown in FIG. 14, to access one or more network-coupled servers, databases, and/or associated cloud-based functionality, as represented by the 106, 115, 116, 117, 118, 304-307, 105, 112, 118, 105, 305, 308. Note that one or more of the web server 1410, application server 1420, and data storage device or database 1430 shown in FIG. 14 may be used to host software corresponding to the entities 106, 115, 116, 117, 118, 304-307, 105, 112, 118, 105, 305, 308, as detailed more fully below.

In the particular example embodiment, the systems depicted in FIGS. 1-4 run in a cloud computing environment that includes a collection of plural web servers 1410, application servers 1420, and data storage devices 1430 shown in FIG. 14.

For example, in a particular example embodiment, various entities displayed on FIGS. 1, 3 and 10 may reside on one or more client devices, server devices, or data storages. For example, the user interfaces such as those depicted in FIGS. 5, 6, 7, 8, and 12 can be executed on one or more client devices 1485, 1470, 1460, 1480, 1490. Entities 105, 106, 115, 116, 117, 118, 304-307 may be executed on one or more server devices 1410, 1420. Application server 410 may be implemented on application server 1420. Entities 105, 112, 118, 305, 308 may be implemented on one or more storage devices or databases 1430. Other entities 102, 104, 107, 108, 108, 110, 111, 113, 114 may be implemented on a client device or a server device. This is just one example of where the various entities depicted may reside. Embodiments are well suited for locating various entities differently.

In general, the users of the systems of FIGS. 1, 2, 3 and 4, may subscribe to certain cloud services to facilitate development of software applications and storage of associated files. A cloud service that is configured for software application or process flow development is called a Process Cloud Service (PCS) herein.

A process cloud service may employ a networked database, e.g., the data storage device 1430 of FIG. 14, to store files and other objects used by a given software program being developed. Server-side development environments may be accessible to developers via browsers. The development environments may be backed by the PCS, such that developed software application files are stored in the PCS database corresponding to the one or more of the data storage devices 1430 of FIG. 14.

In a particular example embodiment, the UI display screens (examples of which are shown in FIGS. 5, 6, 7, 8, and 12) include accompanying UI controls and associated options. Example options include options enter data, test button 705, export tab, runtime tab, analytics tab 802, save button 801, cancel button 811, save button 1012, details button 1308, check boxes 806, 804, 805, 1001, 1005, 1006, controls 1009, 1011.

Note that in the particular example embodiment, browsers used by users of user interfaces FIGS. 5-8 and 12, interface with web servers 1410 shown in FIG. 14 to access websites and accompanying webpage code, which is backed by applications used to implement the entities 102 of FIG. 1 and 310 of FIG. 3. The webpage code of the web servers 1410 of FIG. 14 use web services, APIs, and/or other interfacing mechanisms to communicate with application software hosted on application servers 1420 of FIG. 14 of the cloud, which includes a collection of web servers 1410, application servers 1420, and data storage devices 1430 of FIG. 14.

Figure 15:
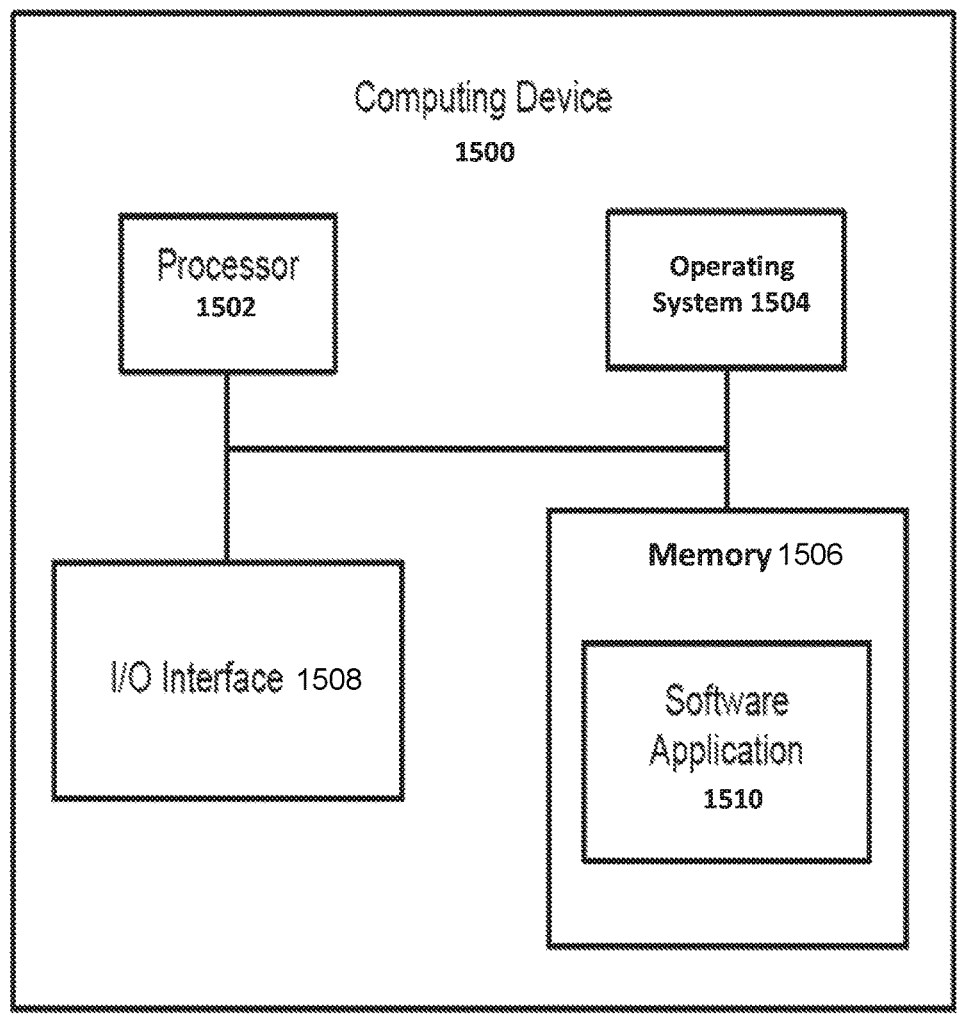
FIG. 15 is a general block diagram of a computing device usable to implement the embodiments of FIGS. 1-13.

FIG. 15 is a general block diagram of a computing device 1500 usable to implement the embodiments described herein. While the computing device 1500 of FIG. 15 may be described as performing one or more of the steps in the embodiments herein, in other embodiments any suitable component or combination of components of the computing device 1500 or any suitable processor or processors associated with system 1500 may facilitate performing the steps.

FIG. 15 illustrates a block diagram of an example computing system 1500, which may be used for implementations described herein. For example, computing system 1500 may be used to implement server devices 1410, 1420 of FIG. 14 as well as to perform the method implementations described herein. In some implementations, computing system 1500 may include a processor 1502, an operating system 1504, a memory 1506, and an input/output (I/O) interface 1508. In various implementations, processor 1502 may be used to implement various functions and features described herein, as well as to perform the method implementations described herein. While processor 1502 is described as performing implementations described herein, any suitable component or combination of components of system 1500 or any suitable processor or processors associated with system 1500 or any suitable system may perform the steps described. Implementations described herein may be carried out on a user device, on a server, or a combination of both.

Computing device 1500 also includes a software application 1510, which may be stored on memory 1506 or on any other suitable storage location or computer-readable medium. Software application 1510 provides instructions that enable processor 1502 to perform the functions described herein and other functions. The components of computing system 1500 may be implemented by one or more processors or any combination of hardware devices, as well as any combination of hardware, software, firmware, etc.

For ease of illustration, FIG. 15 shows one block for each of processor 1502, operating system 1504, memory 1506, I/O interface 1508, and software application 1510. These blocks 1502, 1504, 1506, 1508, and 1510 may represent multiple processors, operating systems, memories, I/O interfaces, and software applications. In various implementations, computing system 1500 may not have all of the components shown and/or may have other elements including other types of components instead of, or in addition to, those shown herein.

CONCLUSION

Although the description has been described with respect to particular embodiments thereof, these particular embodiments are merely illustrative, and not restrictive. For example, the features and operations could be arranged differently. Alternative services or products may be used, for example, for PCS or BICS. Other types of interfaces besides REST APIs may be used. Various embodiments are well suited for other types of cloud services such as at least Service Now or Sales Force.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Various embodiments can be provided with logic encoded in one or more tangible media for execution by one or more hardware processors operable to perform the various embodiments described herein.

We claim:

1. A tangible processor-readable storage device comprising instructions executable by one or more processors, that when executed by the one or more processors perform a method of integrating process cloud services (PCS) with an intelligence cloud service (ICS), wherein the method comprises:

obtaining PCS analytics data using one or more PCS analytics data export application programming interfaces (APIs);

providing a semantic model to a predefined ICS system;

transferring the PCS analytics data to an ICS integration service;

converting the PCS analytics data into a format for a target intelligence system;

transferring the converted PCS analytics data to a service for later distribution as star schema data, for use by Representational State Transfer (REST) Application Programming Interfaces (APIs); and transferring the converted PCS analytics data from the ICS integration service to the predefined ICS system, for use by the ICS integration service to integrate PCS with the ICS system.

2. The tangible processor-readable storage device as recited by claim 1, wherein the method further comprises:
publishing the REST APIs.

3. The tangible processor-readable storage device as recited by claim 2, wherein the publishing of the REST APIs further comprises:
publishing the REST APIs with query parameters for listing archives from the star schema data after a start date and for listing archives from the star schema data till an end date.

4. The tangible processor-readable storage device as recited by claim 2, wherein the method further comprises:
receiving a request, from the target intelligence system, for a portion of the PCS analytics data from the star schema data, wherein a published REST API is used for the request; and
providing the portion of the PCS analytics data from the star schema data to the target intelligence system in response to the request from the published REST API.

5. The tangible processor-readable storage device as recited by claim 1, wherein the target intelligence system is outside of an analytics archive and export service system that includes the PCS and the predefined ICS system.

6. The tangible processor-readable storage device as recited by claim 1, wherein the method further comprises:
creating the semantic model in the predefined ICS system as part of synchronizing the PCS analytics data to the predefined ICS system, wherein the semantic model includes tables with a format <PREFIX>_<DATAOBJECT_NAME>.

7. The tangible processor-readable storage device as recited by claim 1, wherein the predefined ICS system is a business intelligence cloud service (BICS).

8. The tangible processor-readable storage device as recited by claim 1, wherein the format is JAVA SCRIPT® object Notation (JSON) format.

9. The tangible processor-readable storage device as recited by claim 1, wherein the method further comprises:
providing stored archives by storing incremental archives of the PCS analytics data to the star schema data; and
regularly purging old data from the star schema data that is not updateable.

10. The tangible processor-readable storage device as recited by claim 9, wherein the method further comprises:
periodically exporting the incremental archives of the star schema data, wherein the star schema data was updated between a last archive time stamp and a current time stamp.

11. A method of integrating process cloud services (PCS) with an intelligence cloud service (ICS), the method comprises:
obtaining PCS analytics data using one or more PCS analytics data export application programming interfaces (APIs);
providing a semantic model to a predefined ICS system;
transferring the PCS analytics data to an ICS integration service;
converting the PCS analytics data into a format for a target intelligence system;

transferring the converted PCS analytics data to a service for later distribution as star schema data, for use by Representational State Transfer (REST) Application Programming Interfaces (APIs); and transferring the converted PCS analytics data from the ICS integration service to the predefined ICS system, for use by the ICS integration service to integrate PCS with the ICS system.

12. The method as recited by claim 11, wherein the method further comprises:
publishing the REST APIs.

13. The method as recited by claim 12, wherein the publishing of the REST APIs further comprises:
publishing the REST APIs with query parameters for listing archives from the star schema data after a start date and for listing archives from the star schema data till an end date.

14. The method as recited by claim 12, wherein the method further comprises:
receiving a request, from the target intelligence system, for a portion of the PCS analytics data from the star schema data, wherein a published REST API is used for the request; and
providing the portion of the PCS analytics data from the star schema data to the target intelligence system in response to the request from the published REST API.

15. The method as recited by claim 11, wherein the target intelligence system is outside of an analytics archive and export service system that includes the PCS and the predefined ICS system.

16. The method as recited by claim 11, wherein the method further comprises:
creating the semantic model in the predefined ICS system as part of synchronizing the PCS analytics data to the predefined ICS system, wherein the semantic model includes tables with a format <PREFIX>_<DATAOBJECT_NAME>.

17. The method as recited by claim 11, wherein the predefined ICS system is a business intelligence cloud service (BICS).

18. The method as recited by claim 11, wherein the format is JAVA SCRIPT® object Notation (JSON) format.

19. The method as recited by claim 11, wherein the method further comprises:
providing stored archives by storing incremental archives of the PCS analytics data to the star schema data; and
regularly purging old data from the star schema data that is not updateable.

20. An apparatus comprising:
one or more processors; and
a tangible processor-readable storage device including instructions for:
obtaining process cloud services (PCS) analytics data using one or more PCS analytics data export application programming interfaces (APIs);
providing a semantic model to a predefined ICS system;
transferring the PCS analytics data to an intelligence cloud service (ICS) integration service;
converting the PCS analytics data into a format for a target intelligence system;
transferring the converted PCS analytics data to a service for later distribution as star schema data, for use by Representational State Transfer (REST) Application Programming Interfaces (APIs); and transferring the converted PCS analytics data from the ICS integration service to the predefined ICS system, for use by the ICS integration service to integrate PCS with the ICS system.

\* \* \* \* \*

UNITED STATES PATENT AND TRADEMARK OFFICE
CERTIFICATE OF CORRECTION

PATENT NO. : 10,467,070 B2  
APPLICATION NO. : 15/491866  
DATED : November 5, 2019  
INVENTOR(S) : Iqbal et al.

Page 1 of 2

It is certified that error appears in the above-identified patent and that said Letters Patent is hereby corrected as shown below:

In the Drawings

On sheet 8 of 15, in FIGURE 8, under Reference Numeral 804, Line 1, delete "sychronize" and insert -- synchronize --, therefor.

In the Specification

In Column 1, Line 15, after "purposes" insert -- . --.

In Column 2, Line 7, after "system" insert -- . --.

In Column 2, Line 16, after "embodiment" insert -- . --.

In Column 4, Line 51, after "writeOutContent( )" insert -- . --.

In Column 4, Line 63, after "getBICSIntServiceINstance( )" insert -- : --.

In Column 5, Line 45, after "configuration"" insert -- . --.

In Column 5, Line 53, delete "intial" and insert -- initial --, therefor.

In Column 9, Line 5, delete "stackholders)" and insert -- stakeholders) --, therefor.

In Column 9, Line 7, delete "stackholders)" and insert -- stakeholders) --, therefor.

In Column 12, Line 50, delete "BPMNConfig" and insert -- BPMConfig --, therefor.

In Column 15, Line 14, delete "has have" and insert -- has --, therefor.

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*

In Column 24, Line 25, after "system" insert -- . --.

In Column 25, Line 19, delete "Enterprise JavaBeans," and insert -- ENTERPRISE JAVABEANS, --, therefor.